United States Patent
Malone et al.

(10) Patent No.: US 8,406,402 B2
(45) Date of Patent: Mar. 26, 2013

(54) SERVICE CHANGE AND SERVICE FALLBACK IN INTELLIGENT NETWORKS

(75) Inventors: Blaglo Malone, Naples (IT); Alfredo Somma, Naples (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1121 days.

(21) Appl. No.: 12/302,967

(22) PCT Filed: Jun. 1, 2006

(86) PCT No.: PCT/EP2006/005231
§ 371 (c)(1),
(2), (4) Date: Dec. 1, 2008

(87) PCT Pub. No.: WO2007/137615
PCT Pub. Date: Dec. 6, 2007

(65) Prior Publication Data
US 2009/0245496 A1 Oct. 1, 2009

(51) Int. Cl.
*H04M 3/42* (2006.01)
*H04W 4/00* (2009.01)

(52) U.S. Cl. .................................. 379/201.12; 455/433

(58) Field of Classification Search ............. 379/201.12, 379/201.01, 221.08, 207.02, 201.05, 93.14, 379/88.21; 455/561, 461, 450, 435, 433, 455/432.1
See application file for complete search history.

(56) References Cited

U.S. PATENT DOCUMENTS

| | | | | |
|---|---|---|---|---|
| 6,353,740 B1 * | 3/2002 | Granberg | ................. | 455/432.1 |
| 7,212,621 B1 * | 5/2007 | Wallenius | ................. | 379/221.01 |
| 7,242,943 B2 * | 7/2007 | Rasanen | ................. | 455/445 |
| 7,436,820 B2 * | 10/2008 | Beck et al. | ................. | 370/352 |
| 7,860,102 B2 * | 12/2010 | Kallio et al. | ................. | 370/395.2 |
| 7,899,086 B2 * | 3/2011 | Belling | ................. | 370/524 |
| 2002/0077109 A1 * | 6/2002 | Rasanen | ................. | 455/450 |
| 2005/0064821 A1 * | 3/2005 | Hedberg et al. | ................. | 455/67.11 |

FOREIGN PATENT DOCUMENTS

WO      WO 03/032598 A      4/2003

\* cited by examiner

*Primary Examiner* — William Deane, Jr.

(57) ABSTRACT

A technique for service change and service fallback in intelligent networks is described. The network comprises a service control functional component (516) and a service switching functional component (518). A method implementation of the technique includes the step of obtaining (4) from the service switching functional component (518) service preference information for at least one of two or more services indicating a preferred service for a user equipment (510). Further, a service is selected (5) based on the service preference information and service availability information relating to required resources for at least one of the two or more services. The determined service for service change or service fallback is then indicated (6) to the service switching functional component.

30 Claims, 14 Drawing Sheets

200

Send service preference information for at least one of two or more services, the service preference information indicating a preferred service for a user equipment

202

Obtain an indication of a selected service for at least one of service change and service fallback

SERVICE CHANGE AND SERVICE FALLBACK IN INTELLIGENT NETWORKS

TECHNICAL FIELD

The invention relates to service change and service fallback. More specifically, the invention relates to methods and network nodes for controlling at least one of service change and service fallback in an intelligent network.

BACKGROUND OF THE INVENTION

An intelligent network (IN) can be regarded as a service-independent (telecommunications) network. That is, intelligence is taken out of switches and placed in one or more computer nodes that are distributed throughout the network. This provides the network operator with the means to develop and control services more efficiently. Moreover, new capabilities can be rapidly introduced into the network. Once introduced, services are easily customized to meet individual needs of a subscriber.

Specific IN standards are, for example, CAMEL (Customized Application for Mobile Network Enhanced Logic), INAP (Intelligent Network Application Protocol), WIN (Wireless Intelligent Network), CS1 (Capability set 1) and CS1+ (Capability set 1 extended). The CAMEL network feature is defined in the 3GPP TS ($3^{rd}$ Generation Partnership Project Technical Specification) 22.078 and enables the use of Operator Specific Services (OSS) by a subscriber, even when roaming outside the Home-PLMN (Public Land Mobile Network). The CAMEL feature is part of the call control in circuit switched (CS) networks; in addition its interworking with GPRS networks has been specified. The main functional components implementing the CAMEL functionalities are the gsmSCF (GSM Service Control Function) and gsmSSF (GSM Service Switching Function). These functional components interact with MSC (Mobile Services Switching Centre), HLR (Home Location Register) and VLR (Visiting Location Register) of CS networks as described in the 3GGP TS 23.078.

For transmitting multimedia calls over a CS domain, specific codecs are available, namely the synchronous transparent UDI/RDI (un/restricted digital information) codecs with 64 kbit/s and 56 kbit/s, respectively. Throughout this document, the term "multimedia" comprises in particular UDI/RDI multimedia.

The services in a CS domain generally include multimedia and speech (further, less popular services such as facsimile transmission exist). Service change and service fallback related to these services is defined in the 3GGP TS 23.172, "CS multimedia service UDI/RDI fallback and service modification", commonly referred to as the "Service Change and UDI Fallback Feature" (SCUDIF).

Service change in this respect is defined as follows: when two services (multimedia and speech) are available during the active state of a call, users may request a service change to switch between the two services.

Service fallback is defined as follows: when two services (multimedia and speech) are proposed but only one of them is available or wanted, only the service available (preferred or less preferred) is selected, and the other one is discarded.

The SCUDIF feature is available to multimedia calls and permits successful call establishment even when end-to-end CS multimedia data transmission is not possible (fallback to speech) or when signalling of the feature is not possible in the network (fallback to preferred services or speech). Furthermore, the feature allows for a swap between a multimedia service and basic speech during an already established call. The general requirements for SCUDIF are defined in TS 23.172, section 4.1.

The interaction of SCUDIF and CAMEL does, however, not provide any mechanism to autonomously decide on network-initiated service change or service fallback, i.e. scenarios in which it would be appropriate from a network point of view to select, change or set a bearer for the offered service by the network during call establishment or the active phase of a call. In addition, the network cannot control a userinitiated service change request. Examples for such scenarios include user profile or charging restrictions, e.g., insufficient credit for a subscriber to initiate a multimedia call or maintain an already established call.

Whereas any such feature of network-controlled service change and/or service fallback might be implemented e.g. by an MNO (Mobile Network Operator) as an OSS in the network under the control of the operator, the user will be subject to a different behaviour when roaming outside the H-PLMN (Home PLMN), i.e. in a V-PLMN (Visited PLMN). Although the CAMEL feature provides mechanisms to support OSS of the MNO not covered by standardised services when roaming outside the H-PLMN, the interactions of CAMEL with SCUDIF are limited to notifications of the gsmSCF of, for example, the selected services during user-initiated service change after the service change procedure has been successfully completed.

It is an object of the invention to propose a technique for permitting a network-initiated service change or service fallback during call setup or for an established connection in CAMEL-enabled networks.

SUMMARY OF THE INVENTION

According to a first aspect of the invention, a method for controlling at least one of service change and service fallback in a service control functional component of an intelligent network is proposed. The method comprises the steps of obtaining service preference information for at least one of two or more services, the service preference information indicating a preferred service for a user equipment; obtaining service availability information related to required resources for at least one of the two or more services; selecting a service on the basis of the service preference information and the service availability information; and indicating the selected service for at least one of service change and service fallback.

The intelligent network may conform to one or more of the IN-specific standards, for example to CAMEL, INAP, WIN, CS1, CS1+. The intelligent network may be part of a UMTS (Universal Mobile Telecommunications System) network, comprising for example a W-CDMA (Wideband Code Division Multiple Access) or a TD-SCDMA (Time Division Synchronous Code Division Multiple Access) network.

The service preference information may relate to two services, for example a preference of multimedia over speech or vice versa. Alternatively, the service preference information may relate to three (or more) services. These services may also comprise services to be developed in the future.

The step of obtaining the service preference information may be performed according to the 3GPP Service Change and UDI Fallback (SCUDIF) feature as being specified in the TS 23.172. For example, the service switching functional component may send an appropriate CAP (CAMEL Application Protocol) operation "Initial DP" to the service control functional component for transferring the service preference information.

At least one of the two or more services for which the service preference information is obtained may be a requested service or an ongoing service. Whereas according to the first of these alternatives service change or service fallback is preferably controlled during the setup of a call, according to the second one of the mentioned alternatives service change or service fallback is preferably controlled during the active phase of a call.

The service preference information may indicate only a preferred service, or it may indicate at least a preferred service and a less preferred service. The service preference information may for example comprise an indication that a multimedia service is preferred over a speech service. As multimedia calls generally require more resources—for example charging resources of a user, but possibly also network resources—than speech calls, a scenario of network-initiated service change or service fallback from multimedia to speech represents a typical use case of the invention.

Additionally or alternatively, the service preference information may comprise an indication of a user-initiated change of service request. For example, a service change from speech to multimedia during an ongoing call might be requested by the user.

Within a CAMEL framework, event types might be defined to detect such change requests during ongoing calls. Event types may comprise originating and terminating request events. Event detection points (EDP) within a gsmSSF might be configured accordingly for detection, where the configuration in particular comprises configuring (or arming) the EDP. The EDP might be configured with respect to an originating user or terminating user initiated service change request. The EDP might be configured in a Request Report BCSM (RRB) operation or it may be configured otherwise, for example according to a mechanism to be developed in the future.

Upon detection of an event, the detection may be reported to the gsmSCF and the service preference information may at least comprise the requested service. Information related to the requested or preferred service for the user equipment may be obtained for example from a gsmSSF by an Event Report BCSM (Basic Call State Model) related to a user-initiated service change request.

The service availability information may be related to the preferred service. In case the availability information indicates, for example, a lack of available resources for setting up or maintaining a call, a less preferred service might be selected, and a service change or service fallback to the less preferred service will be indicated.

The service availability information may concern resources available for a user of the user equipment. These resources might be related to charging operations, but can additionally or alternatively also be related to other limiting conditions specified in the user profile, for example the user is not subscribed for multimedia calls at all. As a further possibility, the service availability information might be related to user interaction procedures. For example, the service availability information might indicate that in-band information has to be sent, e.g. before call clearing or a service change. In the case the service availability information concerns charging resources available for the user making use of the user equipment, a Prepaid Service Logic (PSL) might be implemented at a service platform in the network and might provide service availability information. The information can indicate that a prepaid credit for the user is not sufficient for setting up or maintaining a call.

The service availability information may instead or further be related to resources available in the network for establishing or maintaining a call from or to the user equipment. For example, the service availability information may indicate that at least one network node required for setting up or maintaining a call lacks the corresponding resources.

The preferred service may be selected if the required resources are available, and another service may be selected if the required resources are not available. For example, multimedia may be specified as the preferred service, and speech may be specified as the less preferred service. In case multimedia is not available due to lack of whatever resources, the less preferred service (speech) is selected.

The selected service might be indicated from a gsmSCF to a gsmSSF. The indication may be transmitted via CAP operations. For example, a CAMEL basic service information element (IE) may be used in a CAP call control operation for indicating the selected service to the gsmSSF. Connect or Continue With Argument operations might be used.

The step of indicating the selected service may alternatively, or additionally, comprise indicating a fallback to the selected service. For example, in a CAMEL framework, the gsmSCF may instruct a fallback to speech during call establishment or during the active phase of the call.

The step of indicating the selected service may also comprise indicating a change of the preferred service. The network may thus change a preferred service as preferred by the user to a preferred service as preferred by the network. The new preferred service might be indicated as the selected service. In addition, the new less preferred service might also be indicated.

Alternatively, the step of indicating the selected service may comprise indicating to continue with the preferred service as indicated in the service preference information. In other words, it may be decided by the service control functional component to allow the preferred service. Therefore, even if a service as preferred by the user is chosen, this is based on a network-controlled decision.

As an indication of the selected service, for example an indicator (such as a flag or bit) might be sent. If the indicator is set, the preferred service indicated in the service preference information is allowed, and if the indicator is not set, the service is not allowed. In the latter case, the call may for example be released.

The step of indicating the selected service may comprise indicating a preferred service and a less preferred service from the point of view of the network. In this case, for example the called subscriber may eventually select one of the preferred and the less preferred service, e.g. depending on the capabilities of the user equipment of the called subscriber.

The step of indicating the selected service may comprise indicating at least one call party to which the service change or service fallback applies. This allows to apply a service change to one call party only. In case no call party is specified, a service change may apply to all call parties.

The step of indicating the selected service may comprise indicating at least one of service change and service fallback during an establishment phase of a call. As an example, within the CAMEL framework, a gsmSCF may instruct a fallback to speech during call establishment.

Alternatively, the step of indicating the selected service may comprise indicating at least one of service change and service fallback during an active phase of a call. As an example, a gsmSCF may instruct a service fallback or service change for an ongoing call due to service availability information obtained after the establishment of the ongoing call.

The step of indicating the selected service may comprise temporarily indicating a first service and subsequently indicating a second service. For example, as a first service, speech may be indicated. This allows for example the sending of in-band information to one or more call parties. After an announcement has been played, a second service (e.g. multimedia, or another service) may be indicated, thus the speech service is changed to multimedia or another service.

According to a second aspect of the invention, a method for controlling at least one of service change and service fallback in a service switching functional component of an intelligent network is proposed. The method comprises the steps of sending service preference information for at least one of two or more services, the service preference information indicating a preferred service for a user equipment, and obtaining an indication of a selected service for at least one of service change and service fallback. The intelligent network may be a telecommunications network conforming for example to CAMEL, INAP, WIN, CS1 and/or CS1+.

The service change or service fallback may be performed according to procedures of the 3GPP Service Change and UDI Fallback feature. For example, the network service change procedures according to the 3GPP TS 23.172 may be executed. Messages "Modify BCb" and "Modify Complete BCb" may be exchanged between an MSC and the user equipment within the framework of the call control protocol used to change the call mode.

The further steps of obtaining an instruction to detect an event related to a userinitiated service change request and detecting the event might be included. An event type IE may be obtained from the service control functional component to arm an event detection point related to an originating user or a terminating user initiated service change request. The IE may for example be embedded in a CAP Request Report BCSM (RRB) operation.

The subsequent step of sending service preference information may comprise including in the service preference information an indication of the service requested in the service change request. Further, the call leg for which the event is reported might be indicated. The information might, for example, be sent with an Event Report BCSM (ERB) to the service control functional component.

The step of establishing a service may include performing service change procedures to change a requested or ongoing service to the selected service. For example, network service change procedures according to the 3GPP TS 23.172 might be performed to change the service for one or more call parties. The network service change procedures might in particular be performed during an ongoing call.

According to a further aspect of the invention, a computer program product is provided, comprising program code portions for performing the steps of any one of the is method aspects described herein, when the computer program product is run on one or more computing devices. The computer program product might be stored on a computer readable recording medium.

According to a still further aspect of the invention, a network node is provided for implementing a service control functional component for controlling at least one of service change and service fallback in an intelligent network. The network node might be adapted to perform any of the method aspects and method steps outlined herein with respect to the service control functional component.

The network node comprises a first interface adapted to obtain service preference information for at least one of two or more services, indicating a preferred service for a user equipment; a second interface adapted to obtain service availability information related to required resources for at least one of the two or more services; a processor adapted to select a service on the basis of the service preference information and the service availability information; and a third interface adapted to indicate the selected service for at least one of service change and service fallback.

The second interface might be adapted to obtain service availability information from the service control functional component, i.e. the service control functional component might be adapted to provide service availability information to the second interface. The service control functional component might for example comprise functional elements to store or generate service availability information from other data, e.g. user-related data.

The intelligent network may be a UMTS network conforming for example to CAMEL. In this case, the third interface might be adapted to indicate the selected service by using a CAMEL basic service information element in a CAP call control operation, in particular in a Connect or a Continue with Argument operation. The Ext-Basic Service Code IE may be used to indicate a preferred service, and the Ext-Basic Service Code 2 IE may be used to indicate a less preferred service. Both IEs might be optional elements for the mentioned CAP operations.

The third interface might be adapted to indicate the selected service by using a CAP operation, which is specifically provided for indicating at least one of a service change and service fallback initiated by the network node. Such a CAP operation might for example be named "Change Service" operation to distinguish the network-decided service change from a user-requested service change. This operation might contain an Ext-Basic Service Code IE to indicate the selected service.

The third interface might additionally, or alternatively, be adapted to indicate the selected service by using a CAP call control operation containing an information element, which is specifically provided for indicating at least one of a service change and service fallback in response to a service change requested by the user equipment. The IE might simply comprise an indicator bit indicating whether the requested service change is allowed or not.

The network node may comprise a fourth interface adapted to indicate in a CAP request report BCSM operation at least one event type, which is specifically provided for detecting a service change requested by the user equipment. Two event types may for example be defined, related to service change requests from an originating user and from a terminating user.

The processor of the network node may be adapted to temporarily select a first service and subsequently select a second service, the first and second service being indicated via the third interface. This allows, for example, to temporarily select speech service, send in-band information to the user equipment, and subsequently switch to another service, for example multimedia.

According to another aspect of the invention, a network node is provided for implementing a service switching functional component for controlling at least one of service change and service fallback in an intelligent network. The network node might be adapted to perform any of the method aspects and method steps outlined above with respect to the service switching functional component.

The network node comprises a first interface adapted to send service preference information for at least one of two or more services, indicating a preferred service for a user equipment; and a second interface adapted to obtain an indication of a selected service for at least one of service change and service fallback.

The first interface may be adapted to send a CAP event report BCSM operation containing an information element, which is specifically provided for indicating a service requested by the user equipment. The IE may, for example, indicate either one of the above-mentioned originating user or terminating user initiated service change request events. The report may further contain an Ext-Basic Service Code IE to indicate the requested service.

The network node may further comprise a third interface adapted to send, in response to the received indication of the selected service, an indication according to SCUDIF for service change or service fallback. The network node controls the service change or service fallback preferably according to the SCUDIF procedures specified in the 3GPP TS 23.172.

In particular variants of the network nodes discussed here, the respective first interface is adapted to obtain or send the service preference information according to procedures of the 3GPP Service Change and UDI Fallback feature. This allows the reuse of existing service control/switching functional components implementing for example CAMEL-SCUDIF-interactions.

A service control functional component may be implemented as a CAMEL gsmSCF. The gsmSCF may be adapted to control SCUDIF procedures according to the invention. The gsmSCF may thus be adapted to autonomously decide to change to a service different from a requested or ongoing service and to instruct a correspondingly adapted gsmSSF accordingly.

The network node implementing a service switching functional component may be embedded in an MSC. A service control functional component might either be set up as a standalone component or it might be executed on a service platform implementing further services related to the network. With CAMEL phase 4, a gsmSCF implementing a service control functional component will be a standalone-device. Each functional component may be executed as a process on a hardware/software platform, for example of the MSC.

The terms "interface" and "processor" as used for the network node aspects of the invention discussed herein are not limited to designating particular hardware devices, but may comprise hardware and/or software components. As an example, the terms "interface" and "processor" may designate interfacing and/or processing components of a software module implementing the service control/switching functional component.

It is apparent to the skilled person that the aforementioned sub-components of the network nodes are adapted to implement the functionalities which are essential to the present invention. For instance, depending on the particular network conditions, the skilled person may decide to implement several of these functionalities on one and the same interface. As an example, the first and second interfaces of the network node implementing the functionality of a service control functional component may be realized within a single interface subcomponent. As a further example, the service control functional component may be provided with a single interface subcomponent only, which is adapted to perform the functionalities for obtaining and indicating data, i.e. the first, second and third interface of the service control functional component as designated above are implemented as a single interface.

Vice versa, the skilled person may choose to introduce further sub-components to implement the functionalities essential to the present invention. As an example, the second interface of the network node implementing the service control functional component is provided to obtain service availability information related to required resources for at least one of the two or more services. This second interface may comprise two interfaces adapted to obtain service availability information from different sources, e.g. from a PSL and additionally from a network resource management component.

The skilled person may decide to implement the functionalities essential to the present invention according to any one of the more detailed or more specific method aspects or steps described herein. In general, then, he will choose the sub-component adapted to perform the particular functionality which is most closely related to the specific aspect or step, and will accordingly adapt this sub-component further. He may, however, also decide to introduce a further sub-component, for example a further interface and/or processor, to provide for the functionality of the specific aspect or step.

BRIEF DESCRIPTION OF THE DRAWINGS

In the following, the invention will be further described with reference to exemplary embodiments illustrated in the figures, in which:

FIG. 3 is a schematic flowchart illustrating a third method embodiment of the present invention;

DETAILED DESCRIPTION OF PREFERRED EMBODIMENTS

In the following description, for purposes of explanation and not limitation, specific details are set forth, such as specific network topologies including particular network nodes, communication protocols etc., in order to provide a thorough understanding of the current invention. It will be apparent to one skilled in the art that the current invention may be practiced in other embodiments that depart from these specific details. For example, the skilled artisan will appreciate that the current invention may be practiced within an intelligent network other than the CAMEL-enabled network discussed exemplarily below. Signalling and control protocols might be used, which are different from the 3GPP CAP and/or SCUDIF standard discussed below to illustrate the present invention. Although primarily multimedia and speech services are considered for service change and service fallback, also other services or multimedia/speech services using different codecs may be considered. Also, the invention may be practised in networks other than the 3GPP CS network domain.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

Figure 1:
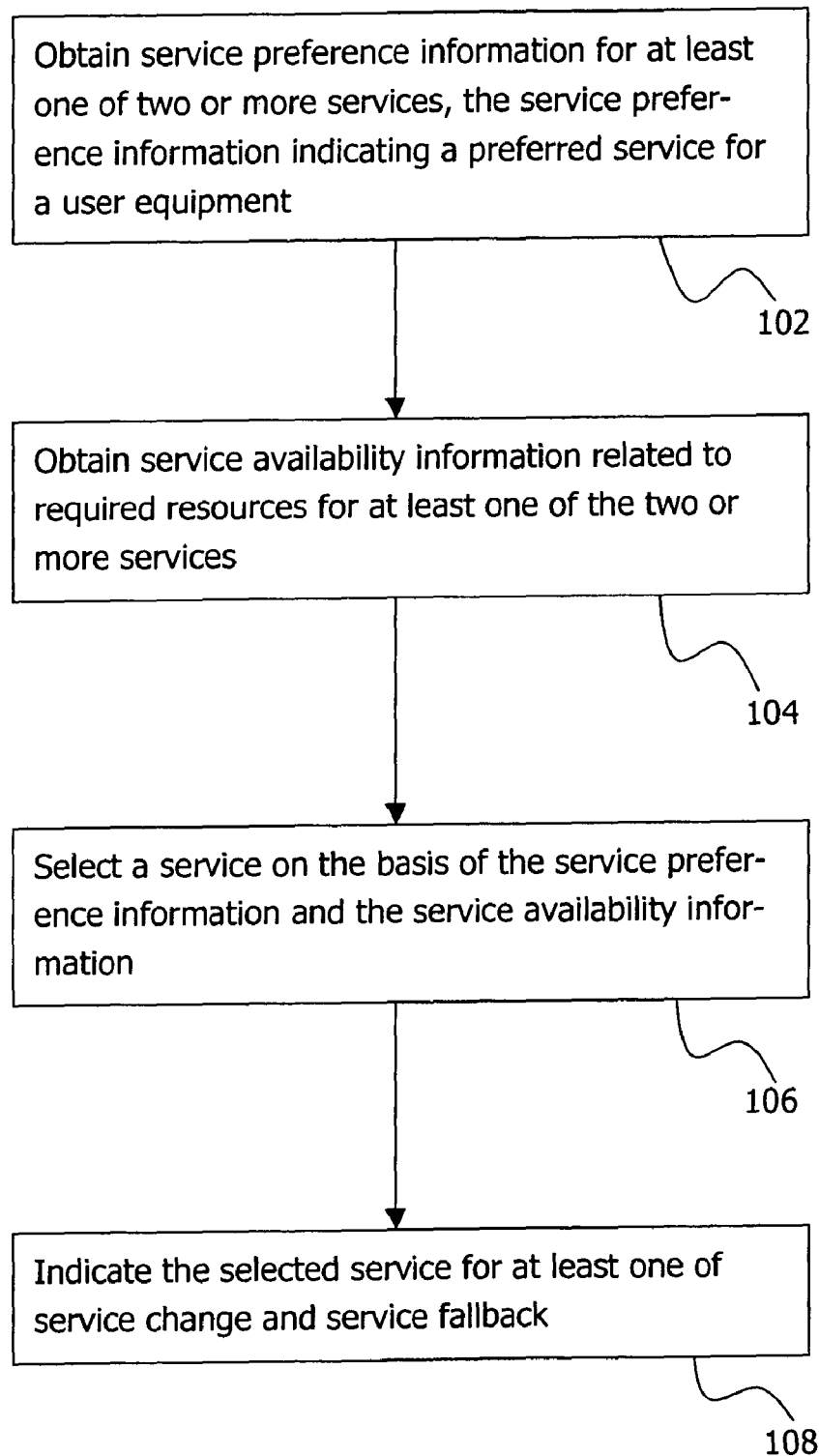
FIG. 1 is a schematic flowchart illustrating a first method embodiment of the present invention.

With reference to FIG. 1, a flow chart 100 shows the individual steps of a first method embodiment for controlling at least one of service change and service fallback in a service control functional component.

In a first step 102, service preference information for at least one of two or more services is obtained, the service preference information indicating a preferred service for a user equipment service preference information for at least two services. In a next step 104, service availability information related to required resources for at least one of the two or more services is obtained. In a further step 106, a service is selected on the basis of the service preference information and the service availability information. In a step 108, the selected service is indicated for at least one of service change and service fallback. The indication may be towards another network node.

Figure 2:
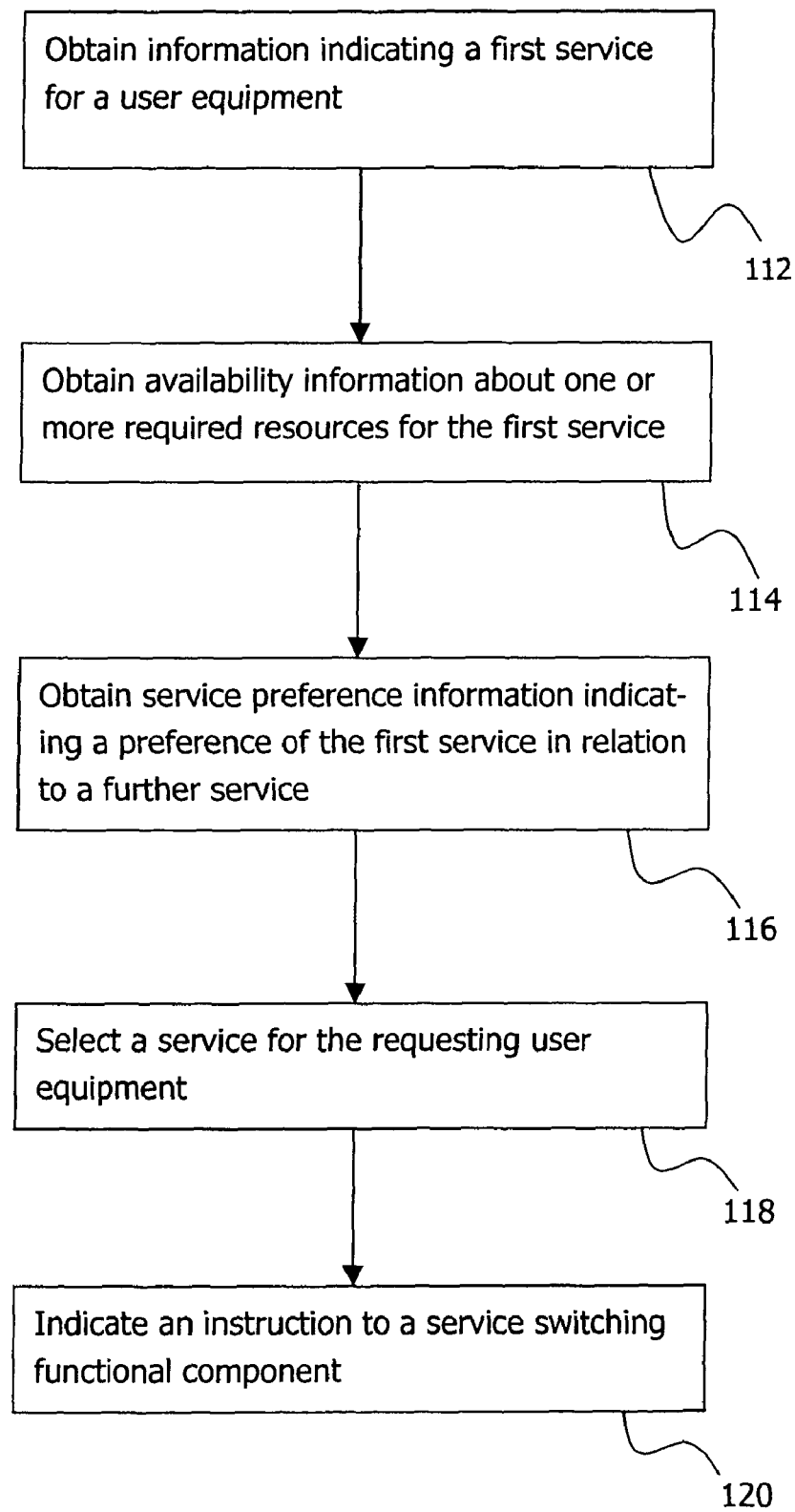
FIG. 2 is a schematic flowchart illustrating a second method embodiment of the present invention.

With reference to FIG. 2, a flow chart 110 shows the individual steps of a second method embodiment for controlling at least one of service change and service fall-back in a service control functional component of a CAMEL-enabled network.

In a first step 112, information indicating a first service for a user equipment is obtained (e.g. indicating a requested or ongoing multimedia call for a user). In a second step 114, service availability information about one or more required resources for the first service is obtained. For example, a multimedia call may be requested but is not supported by the network, or a credit is not sufficient for the initiation or continuation of the multimedia call.

In a third step 116, service preference information is obtained. The service preference information indicates a preference of the first service in relation to at least one further service. For instance, multimedia is preferred over speech, or the user indicates a change of service.

In a further step 118, a service for the requesting user equipment is selected. The selected service is the first service if the one or more required resources are available and the first service is in accordance with the service preference information. The selected service is the at least one further service if the one or more resources are not available and the at least one further service is in accordance with the service preference information.

Once the service control functional component has selected a service for the served user, in a final step 120, one of the following instructions may be indicated to a service switching functional component:
- change the preferred service/service fallback at call establishment;
- service change/service fallback during a call active phase;
- temporary service selection;
- service change/service fallback for one call party;
- controlling of a user-initiated service change request.

With reference to FIG. 3, a flowchart 200 shows the individual steps of a third method embodiment for controlling at least one of service change and service fallback in a service switching functional component of a CAMEL-enabled network. The steps shown in FIG. 3 may be performed in combination with the steps shown in FIGS. 1 and 2.

In a first step 202, service preference information for at least one of two or more services is sent. The service preference information indicates a preferred service for a user equipment. In a further step 204, an indication of a selected service for at least one of service change and service fallback is obtained. In a further step (not shown), the indicated service may be implemented.

Figure 4:
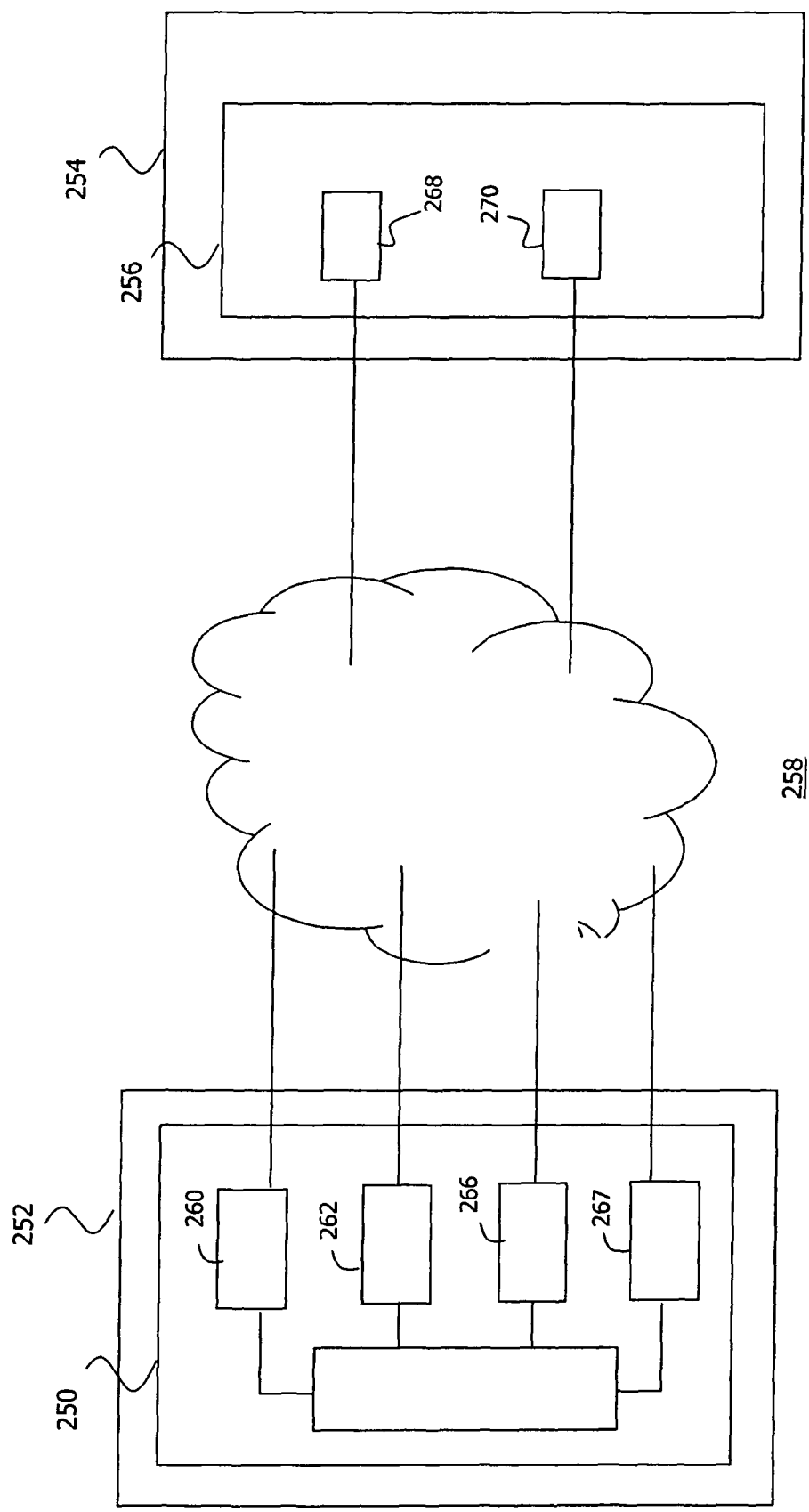
FIG. 4 is a schematic block diagram illustrating modules of a service control and a service switching functional component according to network node embodiments of the invention.

FIG. 4 schematically illustrates a first network node 250 implementing a service control functional component 252 and a second network node 254 implementing a service switching functional component 256 for controlling at least one of service change and service fallback in a CAMEL-enabled network 258.

The service control functional component 252 comprises a first interface 260 adapted to obtain service preference information for at least one of two or more services, indicating a preferred service for a user equipment (not shown). The service control functional component 252 further comprises a second interface 262 adapted to obtain service availability information related to required resources for at least one of the two or more services. Further, the service control functional component 252 comprises a processor 264 adapted to select a service on the basis of the service preference information and the service availability information. The service control functional component 252 in addition comprises a third interface 266 adapted to indicate the selected service for at least one of service change and service fallback.

Within the embodiment shown in FIG. 4, the network node further comprises a fourth interface 267. This interface is adapted to indicate in a CAP request report BCSM operation at least one event type, which is specifically provided for detecting a service change requested by the user equipment.

The service switching functional component 256 comprises a first interface 268 adapted to send service preference information for at least one of two or more services, indicating a preferred service for a user equipment. The service switching functional component 256 further comprises a second interface 270 adapted to obtain an indication of a selected service for at least one of service change and service fallback.

For operating a network configuration including, for example, the network nodes 250 and 254 shown in FIG. 4, the CAPv4 as defined by 3GPP TS 29.078 and 3GPP TS 23.078 may be enhanced according to embodiment described in the following.

In one scenario, an IE might be added to the CAMEL framework carrying an indicator whether the requested service is allowed or not. This IE might be included in a CAP call control operation, for example a Continue With Argument operation. This can be the only IE included, in case the Continue With Argument is used to resume processing after an originating user or terminating user has requested a service change:

| Information element name | Description |
| --- | --- |
| Service Change Request Allowed Indicator | This IE specifies whether the requested service change is allowed or not. |

A gsmSCF corresponding to the service control functional component 252 of FIG. 4 will reply with Continue With Argument to a reported event, when the corresponding event detection point has been armed in the "Interrupt" mode.

Further, "Basic Service" IEs as shown in the table below might be added to the existing CAP Connect and Continue With Argument call control operations:

| Information Element name | Description |
| --- | --- |
| Ext-Basic Service Code | This IE indicates the basic service, i.e. teleservice or bearer service. For a SCUDIF call this IE indicates the basic service of the preferred service. |
| Ext-Basic Service Code 2 | This IE indicates the basic service of the less preferred service for a SCUDIF call. |

The above Information Elements might be optional for CAMEL scenarios making use of the techniques of the invention. The indicated basic telecommunication service may be a bearer service transporting data between user-network-interfaces or a teleservice, i.e. a user end-to-end telecommunication service. Within the framework of the 3GPP SCUDIF feature, the "Ext-Basic Service Code" might for example indicate the preferred service, and the IE "Ext-Basic Service Code 2" might indicate the less preferred service. A receiving entity, e.g. a gsmSCF, may be adapted to interpret a CAP operation with only a single IE (for example the Ext-Basic Service Code) as a requirement for service fallback to the single indicated service.

According to the embodiment discussed here, an operation "Change Service" may be added to the CAMEL framework to initiate SCP(Signalling Control Point)-originated service change toward one or both parties at any time in the call. As an example, when the gsmSCF can no longer support an ongoing multimedia call, e.g. due to charging conditions, a service-change from multimedia to speech may be initiated with the Change Service operation. A gsmSSF, corresponding to the service switching functional component 256 of FIG. 4, will then initiate the network-based service change procedures in accordance with 3GPP TS 23.172.

The following Information Elements are proposed:

| Information element name | Description |
| --- | --- |
| Leg ID | This IE indicates the party in the call to which the service change applies. If this IE is not present, then the service change applies to both call parties in the call. |
| Ext-Basic Service Code | This IE indicates the new basic service code requested by the gsmSCF. |

The step of indicating the selected service may comprise temporarily indicating a first service and subsequently indicating a second service. In this way, for instance, a user interaction procedure can be used for a SCUDIF call with multimedia as preferred service. Suitable user interaction procedures comprise the CAP operations Connect To Resource and Establish Temporary Connection. Speech service selection procedures might be initiated for the purpose of sending in-band-information to one or more of the call parties.

The subsequent step of sending service preference information may comprise including in the service preference information an indication of the service requested in the service change request. Further, the call leg for which the event is reported might be indicated. The information might, for example, be sent with an Event Report BCSM (ERB) to the service control functional component.

An event detection point (EDP) may be added to the existing CAMEL framework to detect a user initiated service change "request" during the active phase of the call. To this end, event types O-Service_Change_Request and T-Service_Change_Request may be added in the Event Report BCSM (ERB) operation to specify the user initiated service change "request" event during the active phase of the call.

| Information element name | Description |
| --- | --- |
| Event Type BCSM | This IE specifies the type of event that is reported. |
| Leg ID | This IE indicates the party in the call for which the event is reported. |

If the Event Type BCSM IE contains either T_Service_Change_Request or O_Service_Change_Request, then the event specific information BCSM IE contains the following information element:

| Information element name | Description |
| --- | --- |
| Ext-Basic Service Code | This IE is used for SCUDIF calls. It indicates the new basic service requested by originating or terminating user |

A BCSM event may be added in the Request Report BCSM (RRB) operation and in the Event Report BCSM operation to arm and report (respectively) the events discussed above. In detail, the event types O-Service_Change_Request or T-Service_Change_Request may to be added in the Request Report BCSM operation to arm the corresponding EDPs:

| Information element name | Description |
| --- | --- |
| Event type | This IE specifies the type of event for which a report is requested. |
| Leg ID | This IE indicates the party in the call for which the event shall be armed or disarmed. |

Figure 5:
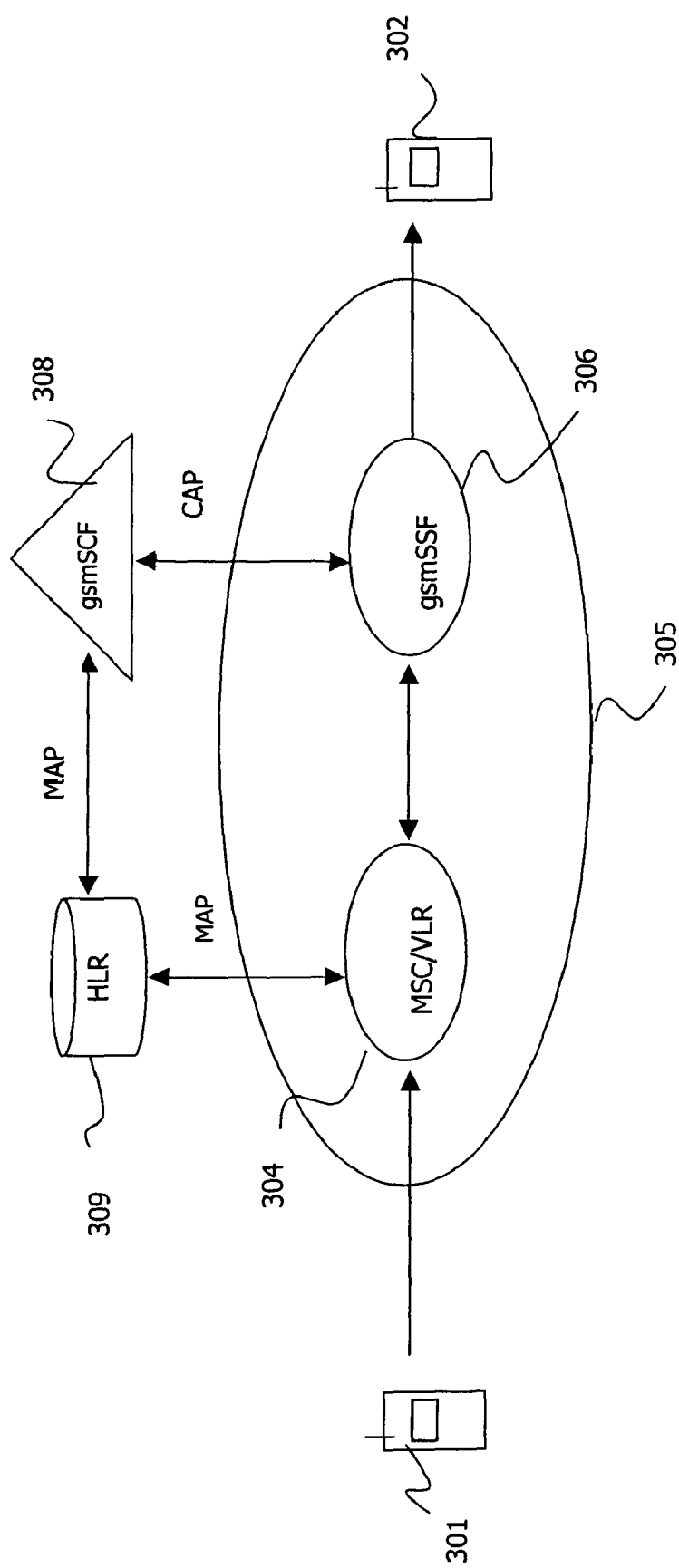
FIG. 5 is a schematic illustration of a network embodiment of the present invention.

FIG. 5 schematically illustrates for an exemplary embodiment of a CAMEL-enabled network the network nodes and functional components involved in the service change and service fallback techniques of the invention. In this embodiment, it is assumed that call is established or maintained between a calling subscriber using user equipment 301 and a called subscriber using user equipment 302. The call is routed over an MSC/VLR 304, which might be the Visiting MSC (V-MSC) for the user equipment 302, i.e. the called subscriber is roaming in a network 305 comprising the MSC 3044. Due to a subscription of the called subscriber regarding the use of CAMEL services, the MSC 304 invokes a CAMEL service switching functional component (gsmSSF) 306. The gsmSSF 306 may for example be a process executed within the MSC hardware/software platform 304.

The gsmSSF 306 communicates via the CAP protocol with a CAMEL service control functional component (gsmSCF) 308, which might be located in the home-network (not shown) of the called subscriber 302. This home-network also hosts an HLR 309 holding data related to the called subscriber, for example data for the CAMEL subscription, but also charging-related data. The gsmSCF 308 and the HLR 309 may communicate via the Mobile Application Part (MAP) protocol.

A service control functional component according to an embodiment has enhanced capabilities related to call control:
- the gsmSCF may be capable to initiate a change of a preferred service/service fallback during call establishment;
- the gsmSCF may be capable to initiate service change/ service fallback during call active phase towards one call party or towards all call parties;
- the gsmSCF may be capable to control a user initiated service change request;
- the gsmSCF may be capable to control service change/ service fallback for one call party only;
- the gsmSCF may be capable to initiate temporary service selection during call establishment.

An embodiment may be applicable to one or more of the following CAMEL scenarios:
- mobile originating calls in an MSC/VLR, when the service control functional component is invoked via an Originating CAMEL Subscription Information (O-CSI);
- mobile terminating calls in a G-MSC (Gateway-MSC), when the service control functional component is invoked via a Terminating CAMEL Subscription Information (T-CSI);
- mobile terminating calls in an MSC/VLR, when the service control functional component is invoked via a Visiting MSC Terminating CAMEL Subscription Information (VT-CSI);
- mobile forwarding calls in an MSC/VLR and G-MSC, when the service control functional component is invoked via O-CSI.

Figure 6:
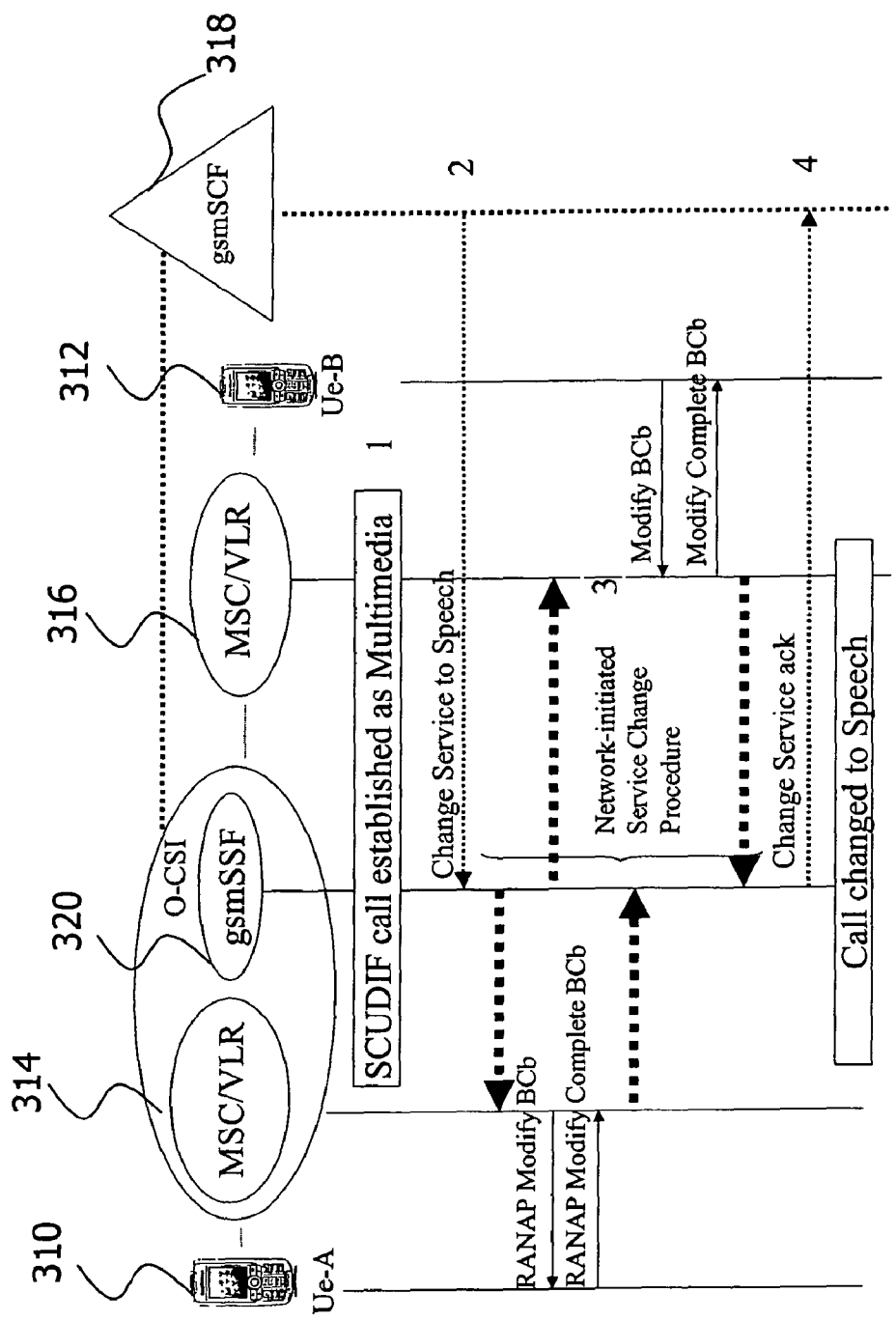
FIG. 6 is a schematic illustration of a mobile originated call with SCP-initiated service change to speech.

A SCUDIF call may also be subjected to N-CSI (Network-CSI) and D-CSI (Dialled Service CSI) services. The above capabilities may also be provided to such services. FIG. 6 schematically illustrates a scenario of a network or SCP (Signalling Control Point) initiated service change procedure with a service change to speech according to an embodiment of the invention derived from FIG. 5. It is assumed that a multi-media SCUDIF call has been established between a user equipment Ue-A 310 and a user equipment Ue-B 312. An MSC/VLR 314 and an MSC/VLR 316 are involved in establishing and maintaining the call. For example, the MSC 314 may be a V-MSC serving the calling subscriber 310 and the MSC 316 may be a V-MSC serving the user equipment 312.

A gsmSCF 318 and a gsmSSF 320 serve as components for implementing CAMEL functionalities. The numbers in circles 1-4 denote individual steps of the change service procedure of the present embodiment.

In step 1, a mobile originated SCUDIF call with multimedia as preferred service is routed towards the V-MSC 316 where the called CAMEL subscriber 312 is located. Due to an originating CAMEL subscription ("Originating CAMEL Subscription Information", O-CSI), the MSC/VLR 314 instantiates the gsmSSF process 320. The gsmSCF 318 instructs the gsmSSF 320 to continue the call with the preferred and less preferred service received from the calling subscriber 310. Multimedia is selected by the called subscriber 312 and the gsmSCF 318 is notified with an Answer event about the selected service.

In step 2, i.e. during the active phase of the call, the gsmSCF 318 selects on the basis of the service preference information obtained in step 1 and service availability information obtained from a local database or from a further network node (not shown) speech as service for the ongoing call. The selected service is indicated to the gsmSSF 320, i.e. a Change Service operation is sent to the gsmSSF 320 with speech as required service. With this operation, the gsmSSF 320 is instructed to change the selected service to speech.

In step 3, the gsmSSF 320 initiates the network service change procedures in accordance with the rules specified in the 3GPP TS 23.172 with the aim to change the service on both sides.

In step 4, when the procedures have been successfully executed, the operation result "Change Service Ack" is returned to the gsmSCF 318.

Figure 7:
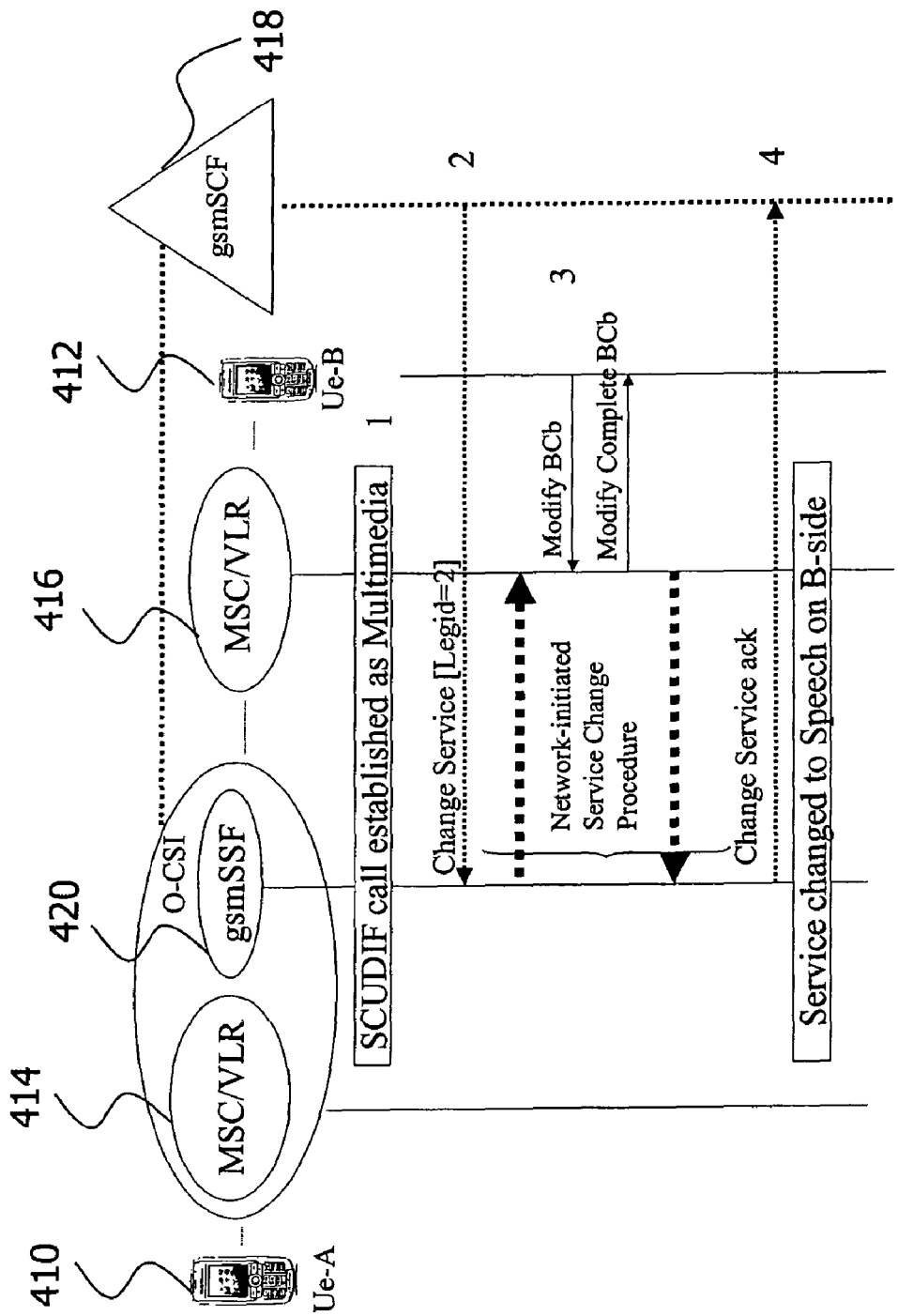
FIG. 7 is a schematic call flow of a mobile originated call with SCP-initiated service change to speech for a user equipment on B-side.

With reference to FIG. 7, a further embodiment is discussed, wherein a (G)MSC/gsmSSF starts the network initiated service change procedure only towards one of the call parties. For this purpose a Leg ID IE is included in a Change Service operation. Here, the (G)MSC/gsmSSF acts as endpoint for the network initiated service change procedures and starts the network initiated service change procedure only towards the call party indicated by the Leg ID.

In FIG. 7, a multimedia SCUDIF call has been established between a user equipment Ue-A 410 and a user equipment Ue-B 412. An MSC/VLR 414 and an MSC/VLR 416 are involved in establishing and maintaining the call. A gsmSCF 418 and a gsmSSF 420 serve as components for implementing CAMEL functionalities. The numbers 1-4 in circles denote individual steps of the change service procedure of the present embodiment.

In step 1, a SCUDIF call with multimedia as preferred service is routed towards the V-MSC 414 where the called CAMEL subscriber 412 is located. Due to the originating CAMEL subscription (O-CSI), the MSC/VLR 414 instantiates a gsmSSF process 420. The gsmSCF 418 instructs the gsmSSF 420 to continue the call setup with the preferred and less preferred service previously received from the calling subscriber 410 as setup options. Multimedia is selected by the called subscriber 412 and the gsmSCF 418 is notified at the Answer event about the service selected by the subscriber 412.

In step 2, i.e. during the active phase of the call, the gsmSCF 418 selects on the basis of the service preference information obtained in step 1 and service availability information obtained for example from a further network node (not shown) speech as service for the ongoing call. The selected service is indicated to the gsmSSF 420, i.e. the gsmSSF 420 is instructed to change the selected service to speech for the B-subscriber 412. To this end the operation Change Service is sent to the gsmSSF 420 with speech as required service for the B-subscriber 412. The IE LegID is set to a value of 2, indicating the B-subscriber.

In step 3, the gsmSSF 420 initiates the existing network service change procedures in accordance with the rules specified in the 3GPP TS 23.172 with the aim to change the service to speech for the B-subscriber 412. The messages "Modify BCb" and "Modify Complete BCb" (BCb: Bearer Capability of the service to switch to) are part of the call control protocol between user equipment and MSC and are used to change the call mode (see 3GPP TS 24.008, chapter 5.3.4.3).

When the procedures have been successfully executed, in step 4 the operation result "Change Service Ack" is returned to the gsmSCF 418.

A media gateway (MGW, omitted from the figures for clarity) may generate an error during the "interim period", when its terminations are being altered and it may have a speech codec on one side of the context and the 3G-324M codec on the other side. In order to prevent such an error, the (G)MSC ordered by the gsmSSF server may modify (via H.248 protocol towards the MGW) the stream-mode of the affected terminations to inactive during the service change toward a single party and shall restore the stream mode to active (send/receive—bothway) only when the selected services become again compatible (3GPP TS 23.172, chapter 4.3.5.1).

Figure 12:
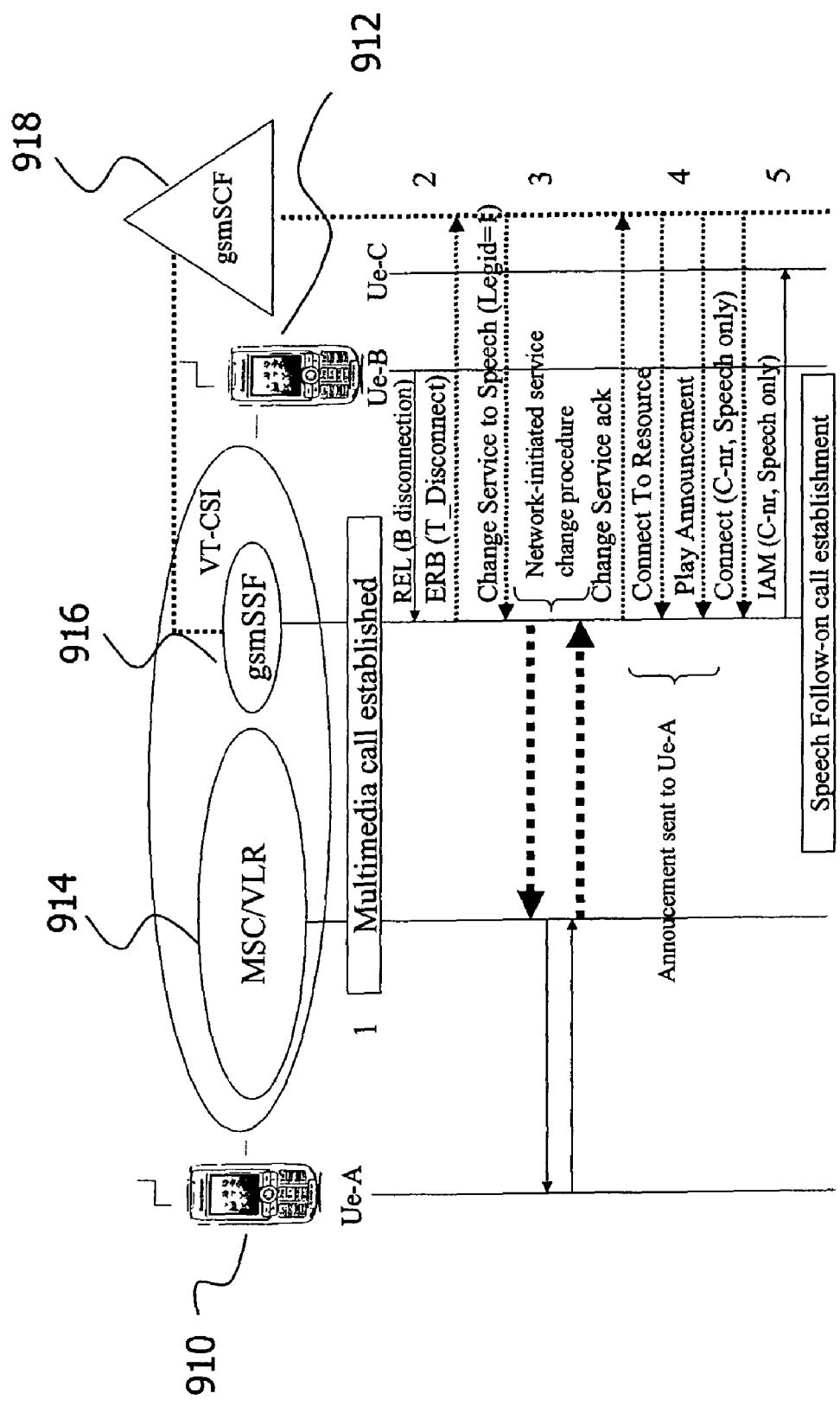
FIG. 12 is a schematic call flow with creation of a follow-on call with speech.
Figure 14:
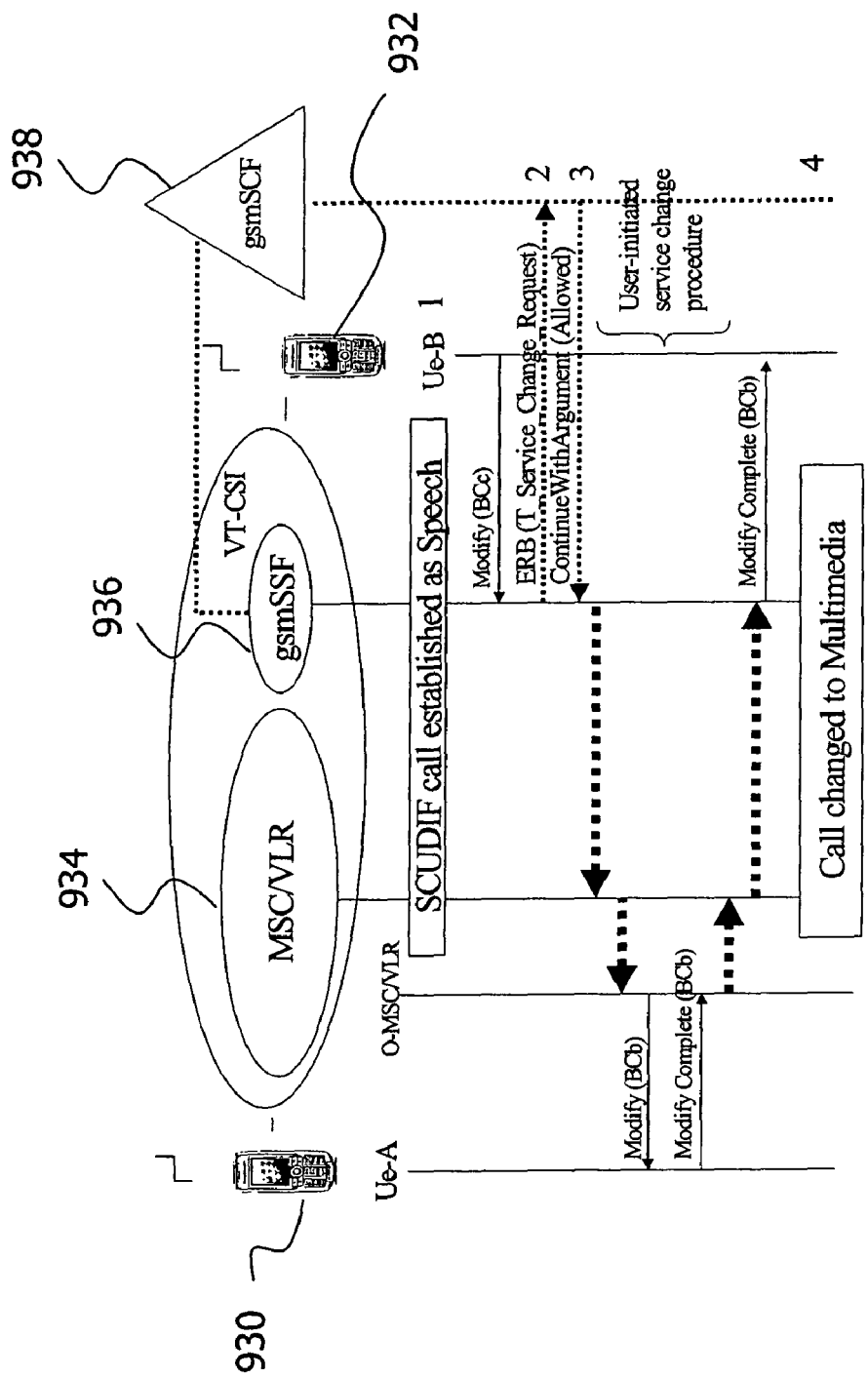
FIG. 14 is a schematic call flow of a call with a user-initiated Service Change request accepted by the gsmSCF.

The Change Service operation with the Leg ID option according to the embodiment discussed here allows a gsm-SCF to:
  change the selected service toward one party only, for example to speech prior to play a warning cut-off announcement (FIG. 14 shows this example in detail);
  change the service of one party in the call when the called party disconnects from an active call, for example prior to set up a follow-on call (FIG. 12 shows this example in detail).

The result of bearer service modification will be returned in the operation result "Change Service Ack" to the gsmSCF.

Service Change/Service Fallback at Call Establishment

During call establishment, a gsmSCF may receive a service preference information in form of a CAP Initial DP (Detection Point) operation indicating the preferred and less preferred services. According to the embodiments described in the following, the gsmSCF selects one of these services in response to the service preference information and service availability information indicating if the required resources are available. Then, by indicating the selected service, the gsmSCF may instruct the gsmSSF to perform one or more of the following actions:
  Fallback to a single service (speech or preferred service)
  Change the preferred service
  Continue as indicated in the Initial DP The above actions are implicitly indicated to the gsmSSF in the Connect or Continue With Argument operation carrying the preferred and less preferred service (if present).

In prior art networks, the gsmSCF cannot change the preferred service or instruct a fallback to a single service (e.g. speech). In case the embodiment outlined above is implemented and the preferred service is not acceptable for the CAMEL service logic (the user may for example have insufficient credit to establish a multimedia call), then the service logic could for example decide to release the call.

The embodiment improves the interaction between CAMEL Charging and SCUDIF. As an example, for a CAMEL prepaid service, when the calling subscriber has not enough credit to initiate e.g. a video call, a fallback to speech can be ordered before playing a warning call setup announcement. The call establishment will continue as speech instead of being released. A fallback to a single service could be ordered by the gsmSCF under certain conditions also without playing announcement.

Figure 8:
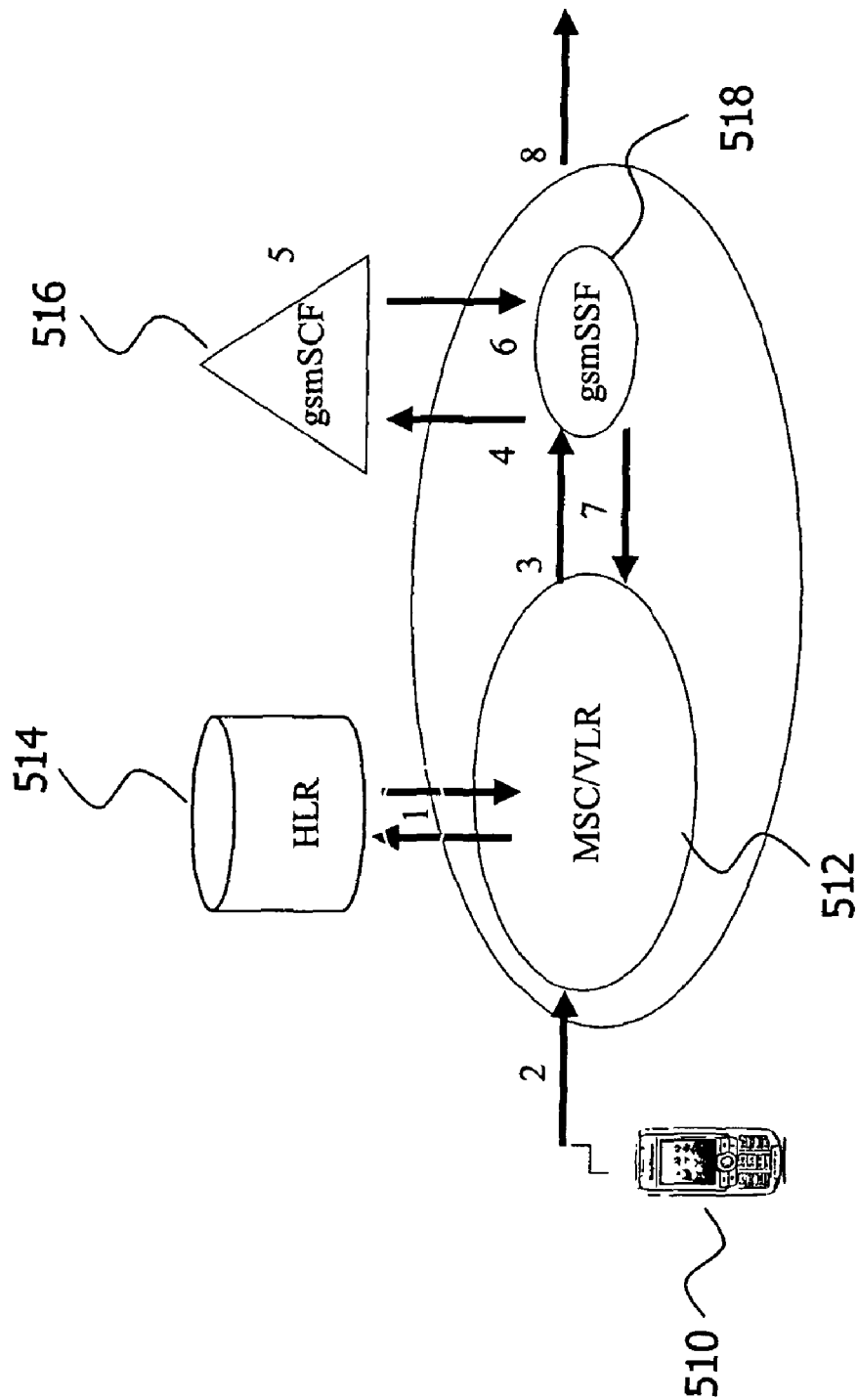
FIG. 8 is a schematic illustration of a mobile originated call with fallback to speech ordered by the gsmSCF.

FIG. 8 shows as an example a fallback to speech ordered by the SCP (Signalling Control Point)/gsmSCF during call establishment initiated by a user equipment 510. An MSC/VLR 512 and an HLR 514 are involved in establishing the call. A gsmSCF 516 and a gsmSSF 518 serve as functional components for implementing CAMEL functionalities. The numbers 1-8 in circles denote individual steps of the call establishment procedure.

In step 1, when the user equipment 510 enters the area the VLR 512 is associated with, a Location Update is performed. The HLR 514 provides the TS11 (speech) and BS30 (multimedia) subscriptions to the MSC/VLR 512 together with CAMEL Subscription Information (CSI).

In step 2, the user equipment 510 initiates a call with multimedia as preferred service. In step 3, due to the CAMEL subscription of the user equipment 510, the MSC/VLR 512 instantiates the gsmSSF process 518. In step 4 the gsmSSF 518 sends a CAP message Initial DP (IDP) to the gsmSCF 516 including a service preference information indicating the preferred (multimedia) and less preferred (speech) service for the call.

In step 5, the gsmSCF 516 selects speech as the only service suitable for the call since a service availability information indicates that the available charging resources are not sufficient for establishing a multimedia call. In step 6 the gsmSCF 516 returns the call control to the gsmSSF 518 via the relevant CAP operation (Connect or Continue With Argument) to continue call establishment. Within this operation, the selected service is indicated: Only speech is provided as the selected service, indicating implicitly fallback to speech.

In step 7 the gsmSSF 518 starts the fallback to speech using SCUDIF procedures. In step 8 the call setup proceeds with speech as the only available service.

Regarding a further example embodiment related to call setup, a CAMEL service is considered which initiates a call forwarding when the call establishment to a called party fails (e.g. due to Busy or No Answer condition). In prior art systems, CAMEL-induced call forwarding is allowed only with the preferred and less preferred service received from the calling subscriber. However, the embodiment discussed here permits that the gsmSCF determines to initiate a call with Call Forwarding, wherein the CAMEL-induced call forwarding service could be activated for one of the following criteria:
  the preferred service only;
  the less preferred service only;
  speech service only;
  both services.

Figure 9:
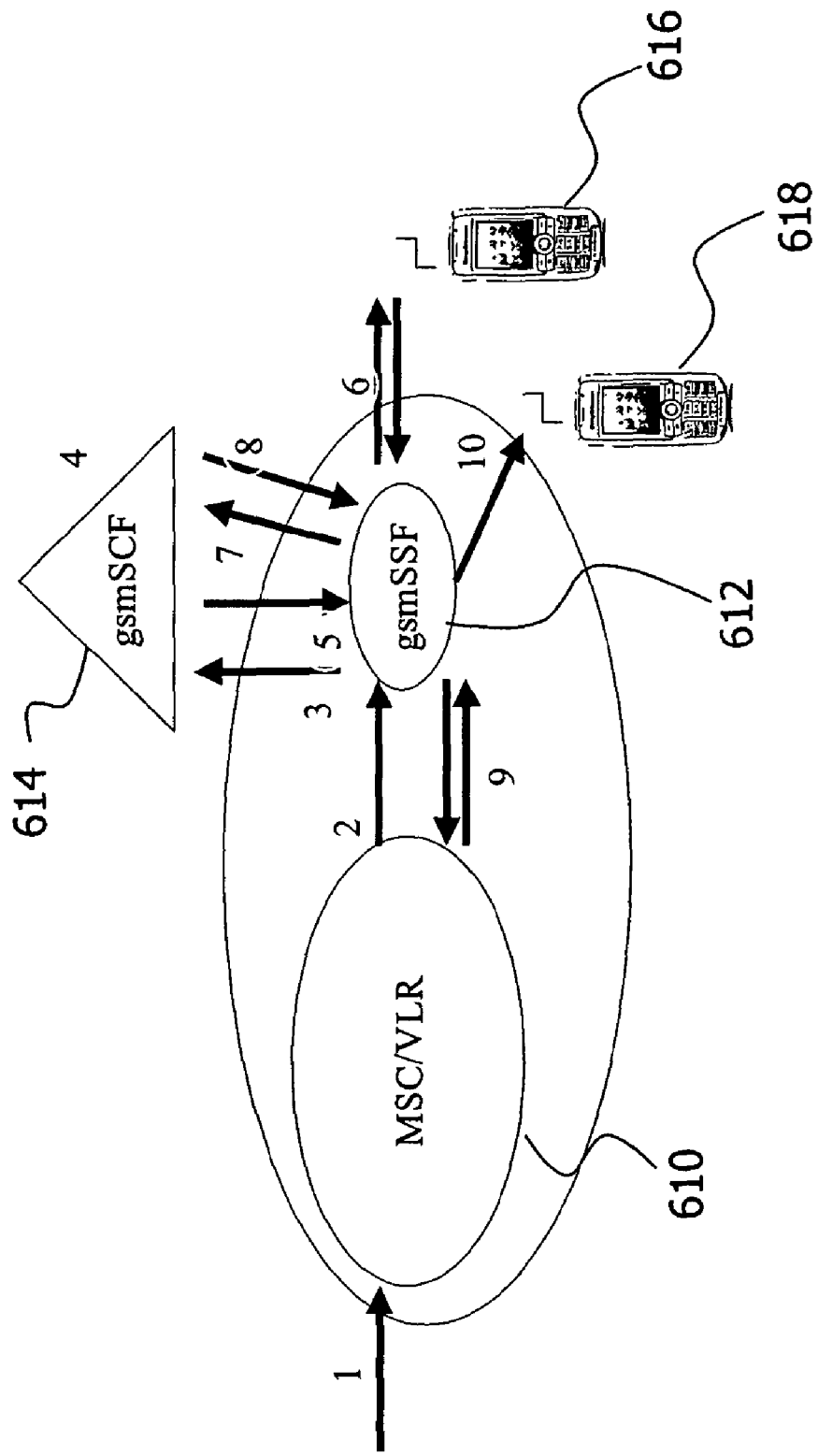
FIG. 9 is a schematic illustration of a call with CAMEL Call Forwarding at Busy.

FIG. 9 shows an example in this regard, wherein a CAMEL-induced Call Forwarding is activated for speech only. An MSC/VLR 610 is involved in establishing the call. A gsmSSF 612 and a gsmSCF 614 serve as functional components for implementing CAMEL functionalities. User equipments 616 and 618 terminate the call on the B-side. The numbers 1-10 in circles denote individual steps of the call forwarding procedure.

In step 1, a call with multimedia as preferred service is routed towards the V-MSC 610, where the called CAMEL subscriber 616 is located. In step 2, due to the CAMEL subscription the MSC/VLR 610 instantiates a gsmSSF process 612. In step 3, the gsmSSF 612 sends a CAP Initial DP to the gsmSCF 614 including a service preference information indicating the preferred service (multimedia) and the less preferred service (speech) for the call.

In step 4, the gsmSCF 614 selects multimedia as selected service, i.e. the call establishment can proceed with multimedia as preferred service, because the required resources are available (for example enough credit), as indicated by a service availability information. In step 5, the gsmSCF 614 returns the call control to the gsmSSF 612 by a relevant CAP operation (such as Continue or Continue With Argument) indicating the selected service and by this indicating to continue the call establishment with multimedia as preferred service.

In step 6, the call is offered to the called subscriber 616 and a busy indication is received back. In step 7, the CAMEL service is notified about the subscriber status and verifies whether Call Forwarding is activated or not. In step 8 the gsmSCF 614 selects speech because another service availability information indicates, that only speech is available as a service which can be activated for the new destination (user equipment 618). The gsmSCF 614 instructs the gsmSSF 612 with a Connect operation indicating the selected speech service to initiate a call-setup towards the new destination (user equipment 618) with speech as the only available service.

In step 9, a fallback to speech is initiated by the gsmSSF 612 also towards the calling party (not shown). In step 10, the call setup towards the user equipment 618 proceeds according to the instruction received from the gsmSCF 614. A successful operation result is returned to the gsmSCF 614 (not shown).

Service Change/Service Fallback During Call Active Phase

In prior art networks, when a user-initiated service change procedure is successfully completed (i.e. the codec modification or mid-call codec negotiation reply message indicates a successful codec modification), and a gsmSSF is linked in the traffic chain, the event can be reported to a gsmSCF with an ERB (Event Report BCSM) operation, provided that the respective service change event (DP "O_Service_Change" or "T_Service_Change") is configured, i.e. armed.

The embodiment discussed in the following allows that, once a call (for example a SCUDIF call) that is subject to CAMEL control is in its active phase, the gsmSCF decides to initiate a service change when one or more resources required for the service in use are not available anymore. For example, when a charging limit reaches a predefined threshold, a Prepaid Service Logic internal or external to the gsmSCF may request a service change to speech. A warning announcement may follow such a service change.

Figure 10:
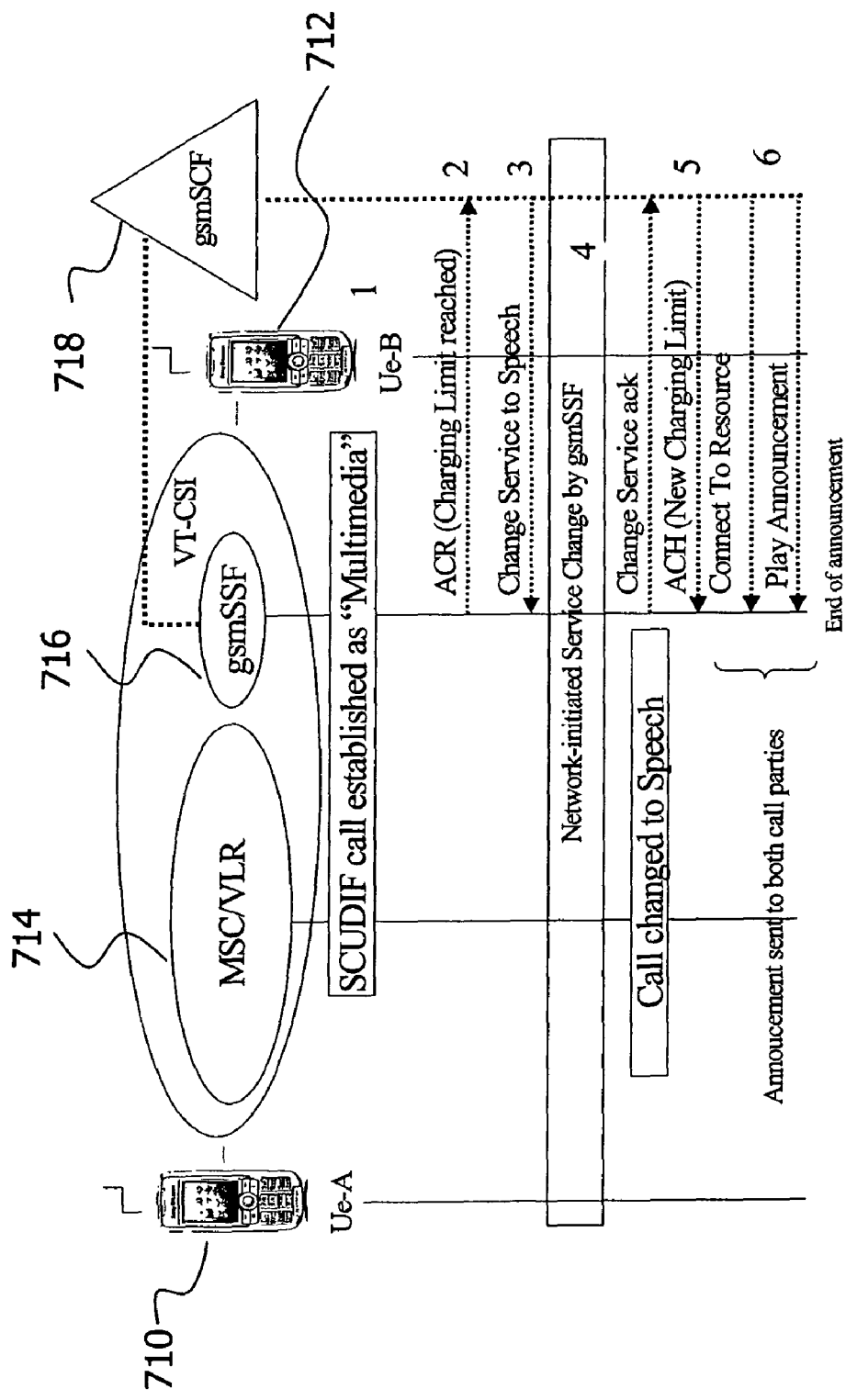
FIG. 10 is a schematic call flow of a call with gsmSCF-induced service change.

In this respect, FIG. 10 shows a gsmSCF-induced service change in a call active state, where announcements are sent to both call parties. A multimedia SCUDIF call has been established between a user equipment Ue-A 710 and user equipment Ue-B 712. An MSC/VLR 714 is involved in establishing and maintaining the call. A gsmSSF 716 and a gsmSCF 718 serve as components for implementing CAMEL functionalities. The numbers 1-6 in circles denote individual steps of the service change procedure.

In step 1, a SCUDIF call with multimedia as the preferred service is routed towards the V-MSC 714, where the called CAMEL subscriber 712 is located. Due to a Visited MSC Terminating CAMEL Subscription (VT-CSI) the MSC/VLR 714 instantiates the gsmSSF process 716. The gsmSCF 718 instructs the gsmSSF 716 to continue the call setup offering the preferred service and the less preferred service received from the calling subscriber 710 for setup. Multimedia is selected by the called subscriber 712. The gsmSCF 718 is notified at Answer event about the service selected by the subscriber 712. The gsmSSF 716 is instructed by the gsmSCF 718 to report when a requested charging limit is reached.

In step 2, when the charging limit is reached, the gsmSSF 716 reports this information to the gsmSCF 718 by an Apply Charging Report (ACR) operation. In step 3, a Prepaid Service Logic associated to the gsmSCF 718 (not shown) determines that only "speech" can be used from this time onwards and indicates this with a service availability information to the gsmSCF 718. The gsmSCF 718 selects speech accordingly and indicates the selected service to the gsmSSF 716, thereby instructing the gsmSSF 716 to change the service to speech.

In step 4 the gsmSSF 716 performs the service change to speech using network-initiated service procedures. Once the procedures have been executed the result is sent to the gsmSCF 718. In step 5 the gsmSCF 718 instructs the gsmSSF 716 with the Apply Charging (ACH) operation to monitor the new charging limit for the speech call. In step 6, a warning announcement is played.

Temporary Service Selection

In the embodiment discussed in the following, during call establishment, the gsmSCF may instruct a gsmSSF to play a call set up announcement even if multimedia is specified as preferred service. This implicitly indicates to the gsmSSF to start a speech service selection procedure. After playing the announcement, the gsmSCF selects the service to run taking into account received service preference information and service availability information relating to available resources. The gsmSCF may determine that the call setup can proceed with multimedia as preferred service, provided that required resources are available (e.g. enough credit). Then call setup proceeds without service change and service selection will be performed with mid-call codec negotiation procedure.

Figure 11:
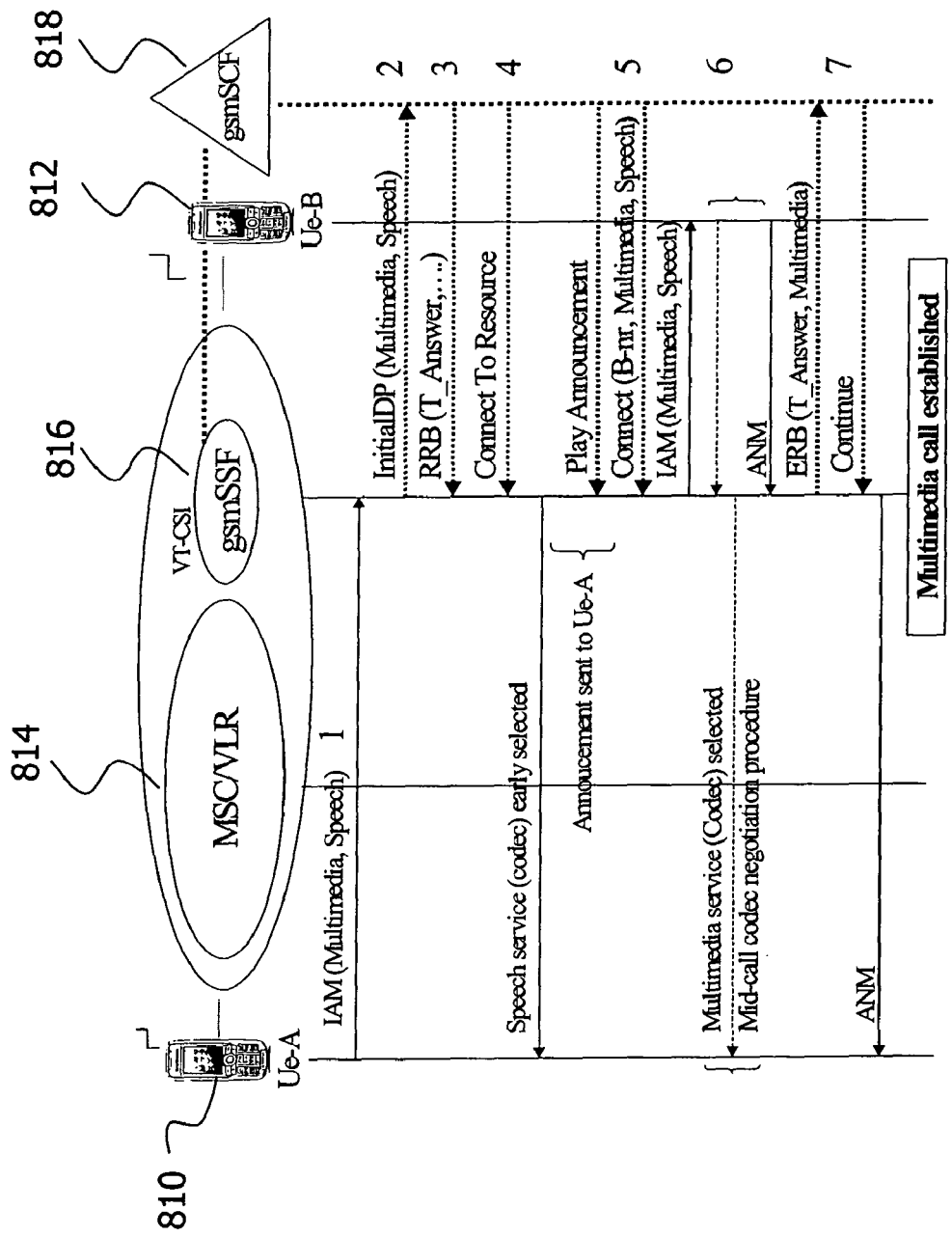
FIG. 11 is a schematic call flow with temporary service selection and announcement during call setup.

FIG. 11 shows an exemplary embodiment, wherein (temporarily) speech is selected as service at call establishment for sending in-band information. A call setup is performed between a user equipment Ue-A 810 and a user equipment Ue-B 812. An MSC/VLR 814 is involved in establishing the call. A gsmSSF 816 and a gsmSCF 818 serve as components for implementing CAMEL functionalities. The numbers 1-7 in circles denote individual steps of the service change procedure.

In step 1, a SCUDIF call with multimedia as preferred service is routed towards the V-MSC 814 where the called CAMEL subscriber 812 is located. Due to a Visited MSC Terminating CAMEL Subscription (VT-CSI), the MSC/VLR 814 instantiates the gsmSSF process 816.

In step 2, the gsmSSF 816 sends a CAP Initial DP operation to the gsmSCF 818 including a service preference information indicating the preferred service (multimedia) and the less preferred service (speech) for the call. The gsmSCF 818 determines that call setup towards the called subscriber 812 can continue with multimedia as preferred service and speech as less preferred service.

In step 3, the gsmSCF 818 instructs the gsmSSF 816 to monitor some events that may occur in the call (e.g. Answer) by an RRB (Request Report BCSM) operation. In step 4, the gsmSCF 818 determines that a call setup announcement has to be played even if multimedia is specified as the preferred service. The Connect To Resource (CTR) operation followed by the Play Announcement (PA) operation are sent by the gsmSCF 818 to instruct the gsmSSF 816 to play the call setup announcement. The gsmSSF 816 forces the selection of "speech" service with standard codec negotiation procedures.

In step 5, the gsmSCF 818 then indicates to the gsmSSF 816 with a Connect operation multimedia as the selected service, by this instructing the gsmSSF 816 to continue the call-setup with multimedia as preferred service. In step 6, the gsmSSF 816 continues the call setup by sending a corresponding IAM (Initial Address Message), wherein multimedia is indicated as service. With a mid-call codec negotiation procedure the selected speech codec is changed to multimedia, a technique known in the art.

In step 7, the selected service is reported to the gsmSCF 818 at Answer event with an ERB (Event Report BCSM) operation. The gsmSCF 818 instructs the gsmSSF 816 to continue the call setup. The call establishment is finalized by propagating back the ANM (Answer) message. Service Change/Service Fallback for one call party A CAMEL service may create a follow-on call when the called party disconnects from an active call. In prior art networks, follow-on calls are not allowed for SCUDIF calls with a negotiated multimedia service. In an exemplary embodiment discussed subsequently, a gsmSCF may determine to create a follow-on call. The follow-on call could be established for one of the following services:
the preferred service only;
the less preferred service only;
speech service only.

The gsmSCF, prior to creating a follow-on call, selects the service that is allowed for the new destination and instructs the gsmSSF accordingly.

FIG. 12 shows as an example in this regard a service change to speech ordered towards the calling party prior to creation of a speech follow-on call. A multimedia call is established between a user equipment Ue-A 910 and a user equipment Ue-B 912. An MSC/VLR 914 is involved in establishing the call. A gsmSSF 916 and a gsmSCF 918 serve as components for implementing CAMEL functionalities. The numbers 1-5 in circles denote individual steps of the service change procedure in this embodiment.

In step 1, a SCUDIF call with multimedia as preferred service is routed towards the V-MSC 914, where the called CAMEL subscriber 912 is located. Due to Visiting-MSC Terminating CAMEL subscription (VT-CSI), the MSC/VLR 914 instantiates the gsmSSF process 916. The gsmSCF 918 instructs the gsmSSF 916 to configure (arm) the Answer, Disconnect-A and Disconnect-B events and to continue the call with the preferred service received from the calling subscriber (not shown). Multimedia is selected by the called subscriber 912 and the gsmSCF 918 is notified at Answer event about the selected service.

In step 2, the subscriber of the UE-B 912 releases the call. The REL (Release) message is received by the gsmSSF 916, which reports the Disconnect-B event to the gsmSCF 918 with an ERB operation. The gsmSCF 918 determines that Follow-on has to be created with speech service only.

In step 3, prior to creating the speech follow-on call, the gsmSCF 918 indicates the selected service to the gsmSSF 916 with a Change Service operation and thereby instructs the gsmSSF 916 to change the service to speech. The gsmSSF 916 uses network service change procedures (i.e. mid-call modification or negotiation procedure) known to the skilled person to change the service to speech. The operation result is sent to the gsmSCF 918 with a Change Service Ack message.

In step 4, the gsmSCF 918 starts a user interaction procedure to insert in-band information. The operations Connect To Resource and Play Announcement are sent by the gsmSCF 918 to instruct the gsmSSF 916 to play the warning announcement. In step 5, when the announcement has been played, the gsmSCF 918 instructs the gsmSSF 916 with a Connect operation to start the speech follow-on call. An IAM is sent with speech as the only available service. When the call is answered, A- and C-subscriber can communicate.

According to the existing CAMEL-SCUDIF interaction framework, a gsmSCF is not allowed to instruct a gsmSSF to send in-band information (e.g. tones or announcements with a user interaction procedure) in the active phase of a call, if a SCUDIF call with negotiated multimedia service is to be cleared. In an exemplary embodiment discussed in the following, the gsmSCF determines to send in-band information before a SCUDIF call with negotiated multimedia service to be cleared. The gsmSCF instructs the gsmSSF to perform a service change to speech using known procedures for mid-call codec modification to speech prior to insertion of the in-band information.

Figure 13:
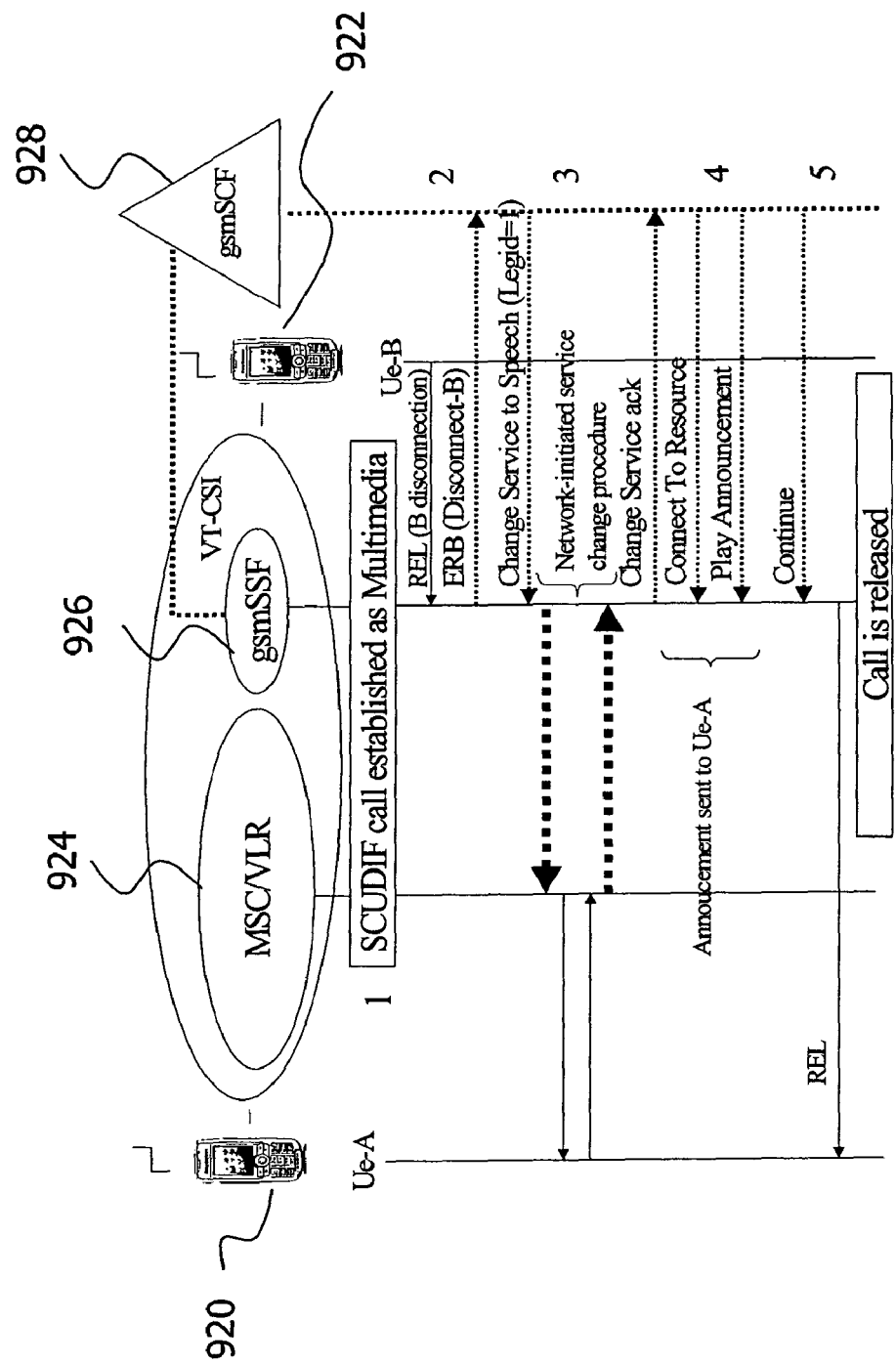
FIG. 13 is a schematic call flow of a call with announcement sent before call clearing.

This embodiment is further described with reference to FIG. 13. A SCUDIF call setup is performed between a user equipment Ue-A 920 and a user equipment Ue-B 922. An MSC/VLR 924 is involved in establishing the call. A gsmSSF 926 and a gsmSCF 928 serve as components for implementing CAMEL functionalities. The numbers 1-5 in circles denote individual steps of the service change procedure of this embodiment.

In step 1, a SCUDIF call with multimedia as preferred service is routed towards the V-MSC 924, where the called CAMEL subscriber 922 is located. Due to Visited MSC Terminating CAMEL subscription (VT-CSI) the MSC/VLR 924 instantiates the gsmSSF process 926. The gsmSCF 928 instructs the gsmSSF 926 to arm the Answer, Disconnect-A and Disconnect-B events and to continue the call with the preferred service received from the calling subscriber (not shown). Multimedia is selected by the called subscriber 922 and the gsmSCF 928 is notified at Answer event about the selected service.

In step 2, the subscriber of the UE-B 922 releases the call. The REL message is received by the gsmSSF 926, which reports the Disconnect-B event to gsmSCF 928 with an ERB operation. The gsmSCF 928 determines that a cut-off announcement has to be played before the call is finally cleared.

In step 3, prior to starting an in-band information sending procedure, the gsmSCF 928 selects speech as service and indicates the selected service to the gsmSSF 926 with a Change Service operation, thereby instructing the gsmSSF 926 to change the service to speech. The gsmSSF 926 uses known network service change procedures (i.e. mid-call modification or negotiation procedure) to change the service to speech. The operation result is sent to the gsmSCF 928.

In step 4, the gsmSCF 928 starts a user interaction procedure to insert in-band information. The Connect To Resource and the Play Announcement operations are sent by the gsmSCF 928 to instruct the gsmSSF 926 to play a cut-off announcement. When the announcement has been played, in step 5, the gsmSCF 928 instructs the gsmSSF 926 to clear the call and a REL message is propagated to the calling subscriber 920.

Controlling of User Initiated Service Change Request

A gsmSCF may request a gsmSSF to monitor a user initiated service change request event. The request may be sent at any time during a call. The gsmSCF may instruct the gsmSSF with an RRB operation to report this event. In case the event is detected by the gsmSSF in the active phase of the call, a report is sent to the gsmSCF with an ERB operation, and the gsmSSF waits for further instructions when armed in "interrupt" mode.

In this embodiment, the gsmSCF comprises logic to either accept or not accept any request for service change. This is further illustrated with reference to FIG. 14, which shows as an example a user-initiated service change accepted by a gsmSCF. In this example a SCUDIF call that is subject to CAMEL is established as speech call with multimedia also being available. When the called subscriber initiates a service change to multimedia, this request is reported to the gsmSCF, provided that the Service Change Request (DP T_Service_Change_Request or O_Service_Change_Request) Event is armed.

A SCUDIF call setup is performed between a user equipment Ue-A 930 and a user equipment Ue-B 932. An MSC/VLR 934 is involved in establishing the call. A gsmSSF 936 and a gsmSCF 938 serve as components for implementing CAMEL functionalities. The numbers 1-4 in circles denote individual steps of the service change procedure according to this embodiment.

In step 1, a SCUDIF call with speech as preferred service is routed towards the V-MSC 934, where the called CAMEL subscriber 932 is located. Due to Visited-MSC Terminating CAMEL Subscription (VT-CSI) the MSC/VLR 934 instantiates a gsmSSF process 936. The gsmSCF 938 instructs the gsmSSF 936 to arm a number of events, in particular an event T_Service_Change_Request; this event belongs to the CAMEL-SCUDIF framework according to the embodiment discussed here. The gsmSCF 938 instructs the gsmSSF 936 to continue the call with the preferred and less preferred services received from the calling subscriber 930. Speech is selected by the called subscriber 932. The gsmSCF 938 is notified at Answer event about the selected service.

In step 2, the subscriber of the UE-B 932 requests to change the service to multimedia, thereby indicating multimedia as preferred service. This service change "request" might not differ from a user-initiated service change in prior art networks, but is referred to as a "request" herein, as the SCP decides to allow the service change or not.

The gsmSSF 936 detects the request and reports the event with an ERB operation to the gsmSCF 938 waiting for further instructions. In step 3, the gsmSCF 938 checks the required resources (e.g. enough credit), thereby obtaining service availability information, and on the basis of the service preference information and the service availability information selects multimedia as the preferred service. The gsmSCF 938 indicates the preferred service multimedia with an operation Continue With Argument to the gsmSSF 936, thereby instructing it to continue with the service change procedure. The parameter Service Change Request Allowed Indicator is contained in the Continue With Argument. The indicator is set to "Allowed". Once the Service Change procedure is finalized, in step 4 the multimedia call is available.

In case a Service Change request is rejected, a gsmSCF might send a Continue With Argument operation, wherein the parameter Service Change Request Allowed Indicator is set to "Not Allowed". Then the Service Change procedure is finalized by a gsmSSF by returning a reject code to the party that requested the Service Change. In addition, the gsmSCF could play an announcement towards the user that requested the Service Change to provide the reason of the rejection of the Service Change request.

The invention allows an increase of the number of successful calls. This is achieved by providing, for example, to the CSE (Camel Service Environment) or any similar intelligent network service platform additional capabilities for service change and/or service fallback. According to embodiments of the invention, SCUDIF services may be reused for service change functionalities in the network. In this respect, the invention allows for an improved interaction of, for example, CAMEL and SCUDIF. Operators, for example MNOs, are enabled to design more flexible IN services, e.g. CAMEL services. For example, using the invention CAMEL pre-paid features could be enhanced by enabling interworking with the SCUDIF feature.

Generally speaking, the invention allows operators to build up new value added services by controlling/providing SCUDIF capabilities with subscriber-personalized services/needs.

While the current invention has been described in relation to its preferred embodiments, it is to be understood, that this disclosure is only illustrative. Accordingly, it is intended that the invention be limited only by the scope of the claims appended hereto.

The invention claimed is:

1. A method for controlling at least one of service change and service fallback in a service control functional component of an intelligent network at a network node, the method comprising the steps of:

obtaining through a first interface service preference information for at least one of two services that include speech service and multi-media service; the service preference information indicating at least a preferred service and a less preferred service for a user equipment;

obtaining through a second interface service availability information related to required resources for at least one of the two services;

selecting with a processor one of the preferred service and the less preferred service on the basis of the service preference information and the service availability information; and indicating through a third interface the selected service for at least one of service change and service fallback using a CAMEL basic service information element in a CAP call control operation.

2. The method according to claim 1, wherein the at least one of two or more services for which the service preference information is obtained Is a requested service or an ongoing service.

3. The method according to claim 1, wherein the service preference information comprises an indication that a multi-media service is preferred over a speech service.

4. The method according to claim 1, wherein the service preference information comprises an indication of a user-initiated change of service request.

5. The method according to claim 1, wherein the service availability information is related to the preferred service.

6. The method according to claim 1, wherein the service availability information is related to resources available for a user of the user equipment.

7. The method according to claim 6, wherein the service availability information is related to charging resources available for the user.

8. The method according to claim 1, wherein the service availability information is related to resources available in the network for establishing or maintaining a call from or to the user equipment.

9. The method according to claim 1, wherein the preferred service is selected if the required resources are available and another service is selected if the required resources are not available.

10. The method according to claim 1, wherein the step of indicating the selected service comprises indicating a fallback to the selected service.

11. The method according to claim 1, wherein the step of indicating the selected service comprises Indicating a change of the preferred service.

12. The method according to claim 1, wherein the step of indicating the selected service comprises indicating to continue with the preferred service as indicated in the service preference information.

13. The method according to claim 1, wherein the step of indicating the selected service comprises indicating a preferred service and a less preferred service for the network.

14. The method according to claim 1, wherein the step of indicating the selected service comprises indicating at least one call party to which the service change or service fallback applies.

15. The method according to claim 1, wherein the step of indicating the selected service comprises indicating at least one of service change and service fallback during an establishment phase of a call.

16. The method according to claim 1, wherein the step of indicating the selected service comprises indicating at least one of service change and service fallback during an active phase of a call.

17. The method according to claim 1, wherein the step of indicating the selected service comprises temporarily indicating a first service and subsequently indicating a second service.

18. A method for controlling at least one of service change and service fallback in a service switching functional component of an Intelligent Network at a network node, the method comprising the steps of:
sending through a first interface service preference information for at least one of two services that include speech service and multi-media service, the service preference information indicating at least a preferred service and a less preferred service for a user equipment;
obtaining through a second interface an indication of a selected service for at least one of service change and service fallback using a CAMEL basic service information element in a CAP call control operation, wherein the selected service is one of the preferred service and the less preferred service.

19. The method according to claim 18, including the further steps of obtaining an instruction to detect an event related to a user-initiated service change request and detecting the event, wherein the step of sending service preference information comprises sending the service requested in the service change request.

20. The method according to claim 18, comprising the further step of establishing the selected service for the user equipment.

21. The method according to claim 20, wherein the step of establishing a service includes performing service change procedures to change a requested or ongoing service to the selected service.

22. A network node for implementing a service control functional component for controlling at least one of service change and service fallback in an intelligent network, wherein the network node comprises
a first interface adapted to obtain service preference information for at least one of two services that include speech service and multi-media service, the service preference information indicating at least a preferred service and a less preferred service for a user equipment;
a second interface adapted to obtain service availability information related to required resources for at least one of the two services;
a processor adapted to select one of the preferred service and the less preferred service on the basis of the service preference information and the service availability information; and
a third interface adapted to indicate the selected service for at least one of service change and service fallback, the third interface is adapted to indicate the selected service by using a CAMEL basic service information element in a CAP call control operation.

23. The network node according to claim 22, wherein the third interface is adapted to indicate the selected service by using a CAP operation, which is specifically provided for indicating at least one of a service change and service fallback initiated by the network node.

24. The network node according to claim 22, wherein the third interface is adapted to indicate the selected service by using a CAP call control operation containing an information element, which is specifically provided for indicating at least one of a service change and service fallback in response to a service change requested by the user equipment.

25. The network node according to claim 22, wherein the network node comprises a fourth interface adapted to indicate in a CAP request report BCSM operation at least one event type, which is specifically provided for detecting a service change requested by the user equipment.

26. The network node according to claim 22, wherein the processor is adapted to temporarily select a first service and subsequently select a second service, the first and second service being indicated via the third interface.

27. A network node for implementing a service switching functional component for controlling at least one of service change and service fallback in a intelligent network, wherein the network node comprises
a first interface adapted to send service preference information for at least one of two services using a CAMEL basic service information element in a CAP call control operation, the service preference information indicating at least a preferred service and a less preferred service for a user equipment;
a second interface adapted to obtain an indication of a selected service for at least one of service change and service fallback using a CAMEL basic service information element in a CAP call control operation, wherein the selected service is one of the preferred service and the less preferred service.

28. The network node according to claim 27, wherein the first interface is adapted to send a CAP event report BCSM operation containing an information element, which is specifically provided for indicating a service requested by the user equipment.

29. The network node according to claim 27, wherein the network node further comprises a third interface adapted to send, in response to the received indication of the selected service, an indication according to SCUDIF for service change or service fallback.

30. The network node according to claim 27, wherein the network node is a mobile services switching centre.

* * * * *